United States Patent [19]

Utagawa

[11] Patent Number: 5,761,549
[45] Date of Patent: Jun. 2, 1998

[54] DISTANCE MEASURING DEVICE FOR CAMERA

[75] Inventor: Ken Utagawa, Yokohama, Japan

[73] Assignee: Nikon Corporation, Tokyo, Japan

[21] Appl. No.: 794,369

[22] Filed: Feb. 4, 1997

[30] Foreign Application Priority Data

Feb. 5, 1996 [JP] Japan .................. 8-018982
Feb. 26, 1996 [JP] Japan .................. 8-038028

[51] Int. Cl.$^6$ .................................. G03R 13/36
[52] U.S. Cl. ......................................... 396/109
[58] Field of Search ............................ 396/106, 107, 396/109

[56] References Cited

U.S. PATENT DOCUMENTS

| | | | |
|---|---|---|---|
| 3,443,502 | 5/1969 | Harvey | 396/109 |
| 4,582,424 | 4/1986 | Kawabata | 396/109 |
| 4,690,538 | 9/1987 | Matsui et al. | 396/109 |
| 4,748,469 | 5/1988 | Tamura | 396/109 |
| 5,109,161 | 4/1992 | Horiuchi et al. | 396/107 |
| 5,500,707 | 3/1996 | Yoshida | 396/109 |

FOREIGN PATENT DOCUMENTS

| | | |
|---|---|---|
| 62-209424 | 9/1987 | Japan . |
| 3-196031 | 8/1991 | Japan . |
| 7-55461 | 3/1995 | Japan . |

Primary Examiner—Russell E. Adams

[57] ABSTRACT

A distance measuring device has a first projecting unit for projecting a first light beam in a direction substantially parallel to a distance measurement axis that connects a distance measuring portion in the angle of view of photograph of a camera, and the object-side principal point of a photograph optical system, a second projecting unit for projecting a second light beam in a direction crossing the distance measurement axis within a predetermined object distance range, a receiving unit arranged to be separated from the first and second projecting units by a given interval to receive light reflected by an object, and a distance detecting circuit for detecting the distance to the object on the basis of the receiving angle or receiving position of the reflected light received by the receiving unit, and the light beam cross section of the second light beam is smaller than that of the first light beam within the object distance range.

36 Claims, 25 Drawing Sheets

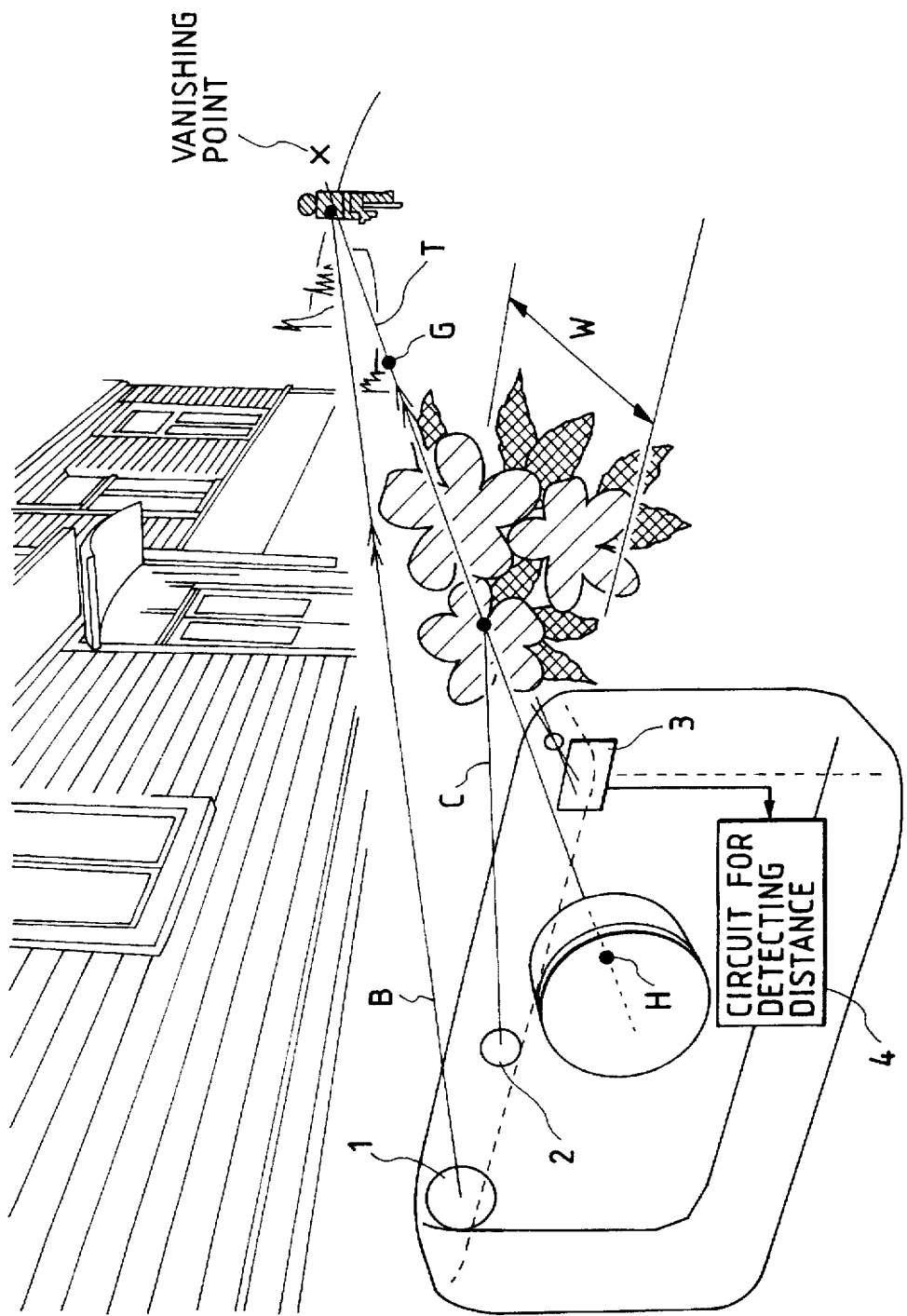

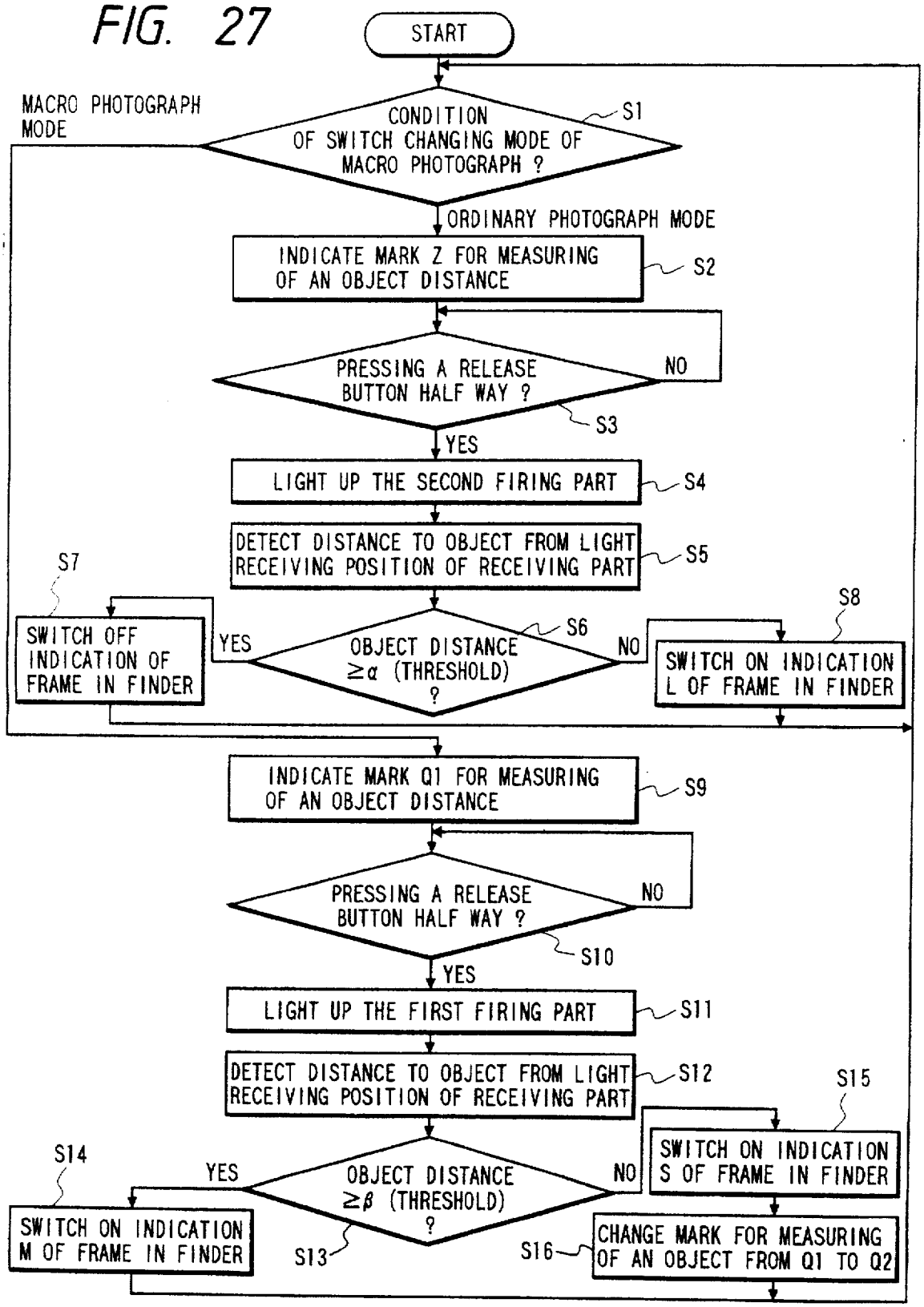

ANGLE OF VIEW IN PHOTOGRAPHING

DISTANCE MEASURING DEVICE FOR CAMERA

The entire disclosure of Japanese Patent Application Nos. 8-18982 and 8-38028 including specifications, claims, drawings and summaries are incorporated herein by reference in its entirety.

BACKGROUND OF THE INVENTION

1. Field of the Invention

The present invention relates to an external light active type distance measuring device, which projects a light beam toward an object (target) of a camera, and detects the distance to the object on the basis of the receiving angle or receiving position of reflected light returning from the object and, more particularly, to a distance measuring device for projecting light beams in at least two directions, and a distance measuring device for performing distance measurements within the range of a specific object distance (e.g., a macro region).

2. Related Background Art

Most lens shutter cameras of earlier technology have external light active type distance measuring devices for trigonometrically measuring the distance to an object. FIG. 28A is a view for explaining a distance measuring device of this type.

Referring to FIG. 28A, a projecting window 143 and a receiving window 144 are arranged on the front surface of a camera 144 to be separated from each other by a predetermined base length. A rod-like light beam V is projected from the projecting window 143 in a direction substantially parallel to the optical axis of a photographic optical system 142, so as not to largely separate therefrom within the range it can travel.

The rod-like light beam returns after it is reflected by an object located in the projecting direction, and is received by the receiving window 144 as reflected light. A distance detecting part 145 performs a trigonometric measurement calculation on the basis of the receiving angle of the reflected light and the base length to obtain the distance to the object.

In such a distance measuring device, since the window position of the projecting window 143 does not perfectly match the optical axis of the photographic optical system 142, the position of the distance measuring portion is slightly offset from the center of the photograph frame (such offset of the distance measuring portion will be referred to as "parallax" hereinafter).

However, in the distance measurement range (e.g., a range 7 to 10 times of the focal length of the photographic optical system 142) in an ordinary photograph mode of the camera 141, since the photograph frame is sufficiently large, the parallax becomes relatively small, as shown in FIG. 28B. Normally, such parallax does not particularly disturb measurements of the object distance.

The projecting window 143 converges the rod-like light beam so as to prevent the light beam section from spreading largely within the distance the rod-like light beam can travel.

In a distance measurement range U in the ordinary photograph mode of the camera 141, since the photograph frame is sufficiently large, the light beam section of the rod-like light beam becomes relatively small, as shown in FIG. 28B. For this reason, nearly one point on the photograph frame can be subjected to distance measurements.

With the above-mentioned operation, the conventional distance measuring device can perform pin-point distance measurements at substantially the center of the photograph frame as long as the distance to be measured falls within the distance measurement range in the ordinary photograph mode. In this way, the photographer using the camera 141 sets an object to be photographed or pictured at the center of the photograph frame using a finder or the like, and can quickly and adequately measure the distance to the object.

As another type of distance measuring device mentioned above, a multi-point distance measuring device for measuring the distances to a plurality of distance measuring portions in the photograph frame is known.

In a multi-point distance measuring device of this type, as shown in FIG. 29A, a light beam is projected in a direction substantially parallel to an axis T that connects a set distance measuring portion and an object-side principal point H of an optical system of photograph (this axis will be referred to as a "distance measurement axis" hereinafter).

In such multi-point distance measuring device as well, since a rod-like light beam V and the position of the distance measurement axis T do not completely match each other, parallax is generated, and the "actual distance measuring portion D" is slightly offset from the "set distance measuring portion I" on a photograph frame F.

However, since the photograph frame F is sufficiently large in the distance measurement range in the ordinary photograph mode of the camera, the parallax of the distance measuring portion becomes relatively small, as shown in FIG. 29B. Normally, such parallax does not particularly disturb distance measurements of the object.

Also, since the photograph frame F is sufficiently large in the distance measurement range in the ordinary photograph mode of the camera, the light beam section of the rod-like light beam becomes relatively small, as shown in FIG. 29B. For this reason, nearly one point on the photograph frame can be subjected to distance measurements.

With the above-mentioned operation, the multi-point distance measuring device of earlier technology can perform pin-point distance measurements at a position very close to the set distance measuring portion on the photograph frame as long as the distance to be measured falls within the distance measurement range U in the ordinary photograph mode.

In recent years, cameras capable of macro photographing have been developed. Such a camera performs distance measurements in a distance range (to be referred to as a "macro region K" hereinafter) closer than the distance about 7 to 10 times of the focal length of the photographic optical system.

However, when the distance measurements of the macro region are performed using the external light active type distance measuring device or multi-point distance measuring device of earlier technology, various problems are posed.

More specifically, in the distance measuring device of earlier technology, since the photograph frame becomes small in the macro region, the parallax between the set and actual distance measuring portions becomes relatively large, and the actual distance measuring portion is largely offset from the center of the photograph frame, as shown in FIG. 28C.

In the multi-point distance measuring device as well, the actual distance measuring portion in the macro region is largely offset from the set distance measuring portion, as shown in FIG. 29C, for the same reason as described above.

As a consequence, in the distance measuring device or multi-point distance measuring device of earlier technology, the distance to a position largely offset from the set distance measuring portion may be measured in the distance measurements of the macro region.

In such situation, the photographer of the camera cannot measure the distance to an object while fixing the object at the center of the photograph frame or at the set distance measuring portion.

For this reason, the photographer must independently perform "distance measurement of the object" and "angle setting of the photograph frame" in consideration of the parallax of the distance measuring portion, and it is hard and cumbersome for the photographer to perform such macro photographing.

In addition, since the photograph frame is small in the macro region, the cross section of the rod-like light beam becomes relatively large, as shown in FIGS. 28C and 29C.

Normally, in macro photographing, since the field depth is extremely small, it is strongly demanded to measure the distance to a small point, and to attain accurate focus adjustment with respect to the measured point.

However, in the distance measuring device of earlier technology, since the section of the rod-like light beam becomes large, the distance to only the small point cannot be precisely measured.

Furthermore, since small objects are normally photographed, the rod-like light beam often spreads outside such object. The spread rod-like light beam is reflected by objects other than the object to be measured, and returns to the camera as noise light. As a consequence, large errors are generated in the distance measurement value of the object.

Note that such problems are experienced (more or less) not only in the distance measurements of the macro region but also upon measuring middle to near distances even in the ordinary photograph mode.

SUMMARY OF THE INVENTION

It is an object of the present invention to provide a distance measuring device which can eliminate the parallax between set and actual distance measuring portions in a specific object distance range (e.g., a macro region) so as to solve the above-mentioned problems.

It is another object of the present invention to provide a distance measuring device which can adequately measure the distance to a small point and can improve the distance measurement precision in a specific object distance range.

It is still another object of the present invention to provide a distance measuring device which can broaden the distance range with small parallax of the distance measuring portion in a specific object distance range.

It is still another object of the present invention to provide a distance measuring device which simplifies the arrangements of two light output (projecting) means.

It is still another object of the present invention to provide a distance measuring device which can adequately display a mark for measuring of an object distance irrespective of the parallax associated with a finder.

It is still another object of the present invention to provide a distance measuring device which can automatically switch at least two marks for measuring of an object distance to be displayed.

It is still another object of the present invention to provide a distance measuring device which can automatically switch two projecting means.

It is still another object of the present invention to provide a distance measuring device which can greatly eliminate the parallax between set and actual distance measuring portions, and can improve the distance measurement precision.

It is still another object of the present invention to provide a distance measuring device which can efficiently illuminate a distance measuring portion and can improve the distance measurement precision.

It is still another object of the present invention to provide a distance measuring device which can adequately display a mark for measuring of an object distance irrespective of the parallax associated with a finder.

It is still another object of the present invention to provide a distance measuring device which can measure the distance to a small point and can greatly improve the distance measurement precision.

It is still another object of the present invention to provide a distance measuring device which can further improve the distance measurement precision.

It is still another object of the present invention to provide a distance measuring device which can measure the distance to a smaller point.

It is still another object of the present invention to provide a distance measuring device which can improve the distance measurement precision.

It is still another object of the present invention to provide a distance measuring device which can also attain measurements of far distances.

FIG. 1 is an explanatory view showing the present invention.

A distance measuring device according to the present invention comprises at least two projecting units.

More specifically, a first projecting unit 1 projects a first light beam B in a direction substantially parallel to a distance measurement axis T as in the device of earlier technology.

On the other hand, a second projecting unit 2 projects a second light beam C in a direction crossing the distance measurement axis T in a predetermined object distance range W (e.g., a macro region or the shortest distance side in the distance measurement range).

The second light beam C is slightly obliquely irradiated onto an object located in the vicinity of the distance measurement axis T within the predetermined object distance range. The light reflected by the object is received via a receiving unit 3, and is used in distance measurements in a circuit 4 for detecting distance (to be referred to as a distance detecting circuit hereinafter).

Accordingly, within the predetermined object distance range, an actual distance measuring portion can be prevented from being largely offset from the set distance measuring portion, and the parallax between the set and actual distance measuring portions becomes small.

When the set distance measuring portion is a point having no area, the distance measurement axis T that connects the distance measuring portion and the object-side principal point of an optical system of photograph (to be referred to as a photograph optical system hereinafter) is defined by a straight line.

On the other hand, when the set distance measuring portion has a certain width such as an allowable range, the distance measurement axis T that connects the distance measuring portion and the object-side principal point of the photograph optical system is defined by a cone which has the object-side principal point as a vertex and the allowable range as a section. In this case, the second light beam C is projected within the range in which the light beam crosses this cone (distance measurement axis T).

In the distance measuring device according to the present invention, the light beam cross section of the second light beam C is set to be smaller than that of the first light beam B within the predetermined object distance range.

Since the first light beam B is projected in the direction substantially parallel to the distance measurement axis T, the parallax of the distance measuring portion becomes smaller as the object is located farther. For this reason, the first light beam B is suitable for measuring far distances.

On the other hand, since the second light beam C is projected in the direction crossing the distance measurement axis T, the parallax of the distance measuring portion becomes small in the vicinity of its crossing point. For this reason, the second light beam C is suitable for measuring specific distance ranges such as near or middle distances.

If the first and second light beams B and C are set to have nearly equal light beam cross sections, the ratio of the light beam cross section, on the photograph frame, of the second light beam C used for the near-distance range becomes large relative to that of the first light beam B, resulting in imbalance between the two light beams.

In view of this problem, if the light beam section of the second light beam C is set to be smaller than that of the first light beam B within at least the above-mentioned "object distance range", the first and second light beams B and C can be well-balanced on the photograph frame.

In particular, the field depth of the photograph optical system becomes extremely small in the near-distance range. However, when the light beam cross section of the second light beam C is decreased, the distance to a small point can be precisely measured, and the focus of the camera can be brought to a desired point.

Even when a small object is to be photographed, the second light beam C rarely spreads outside the object, and light components reflected by objects other than the object to be photographed can be eliminated, thus greatly improving the distance measurement precision.

In a distance measuring device according to another embodiment of the present invention, the exit pupil of the second light beam C is set to be smaller than that of the first light beam B.

Since the first light beam B is projected in the direction substantially parallel to the distance measurement axis T, the parallax of the distance measuring portion becomes smaller as the object is located farther. For this reason, the first light beam B is suitable for measuring far distances.

On the other hand, since the second light beam C is projected in the direction crossing the distance measurement axis T, the parallax of the distance measuring portion becomes small in the vicinity of its crossing point. For this reason, the second light beam C is suitable for measuring specific distance ranges such as near or middle distances.

If the first and second light beams B and C are set to have nearly equal exit pupil sizes, the ratio of the light beam section, on the photograph frame, of the second light beam C used for the near-distance range becomes large relative to that of the first light beam B, resulting in imbalance between the two light beams.

In view of this problem, as shown in FIG. 2A, when the exit pupil of the second light beam C is set to be smaller than that of the first light beam B, the first and second light beams B and C can be well-balanced in association with the ratio of the light beam sections on the photograph frame.

In particular, the field depth of the photograph optical system becomes extremely small in the near-distance range. However, when the exit pupil of the second light beam C is decreased, the distance to a small point can be precisely measured, and the focus of the camera can be brought to a desired point.

Even when a small object is to be photographed, the second light beam C rarely spreads outside the object, and light components reflected by objects other than the object to be photographed can be eliminated, thus greatly improving the distance measurement precision.

In a distance measuring device according to still another embodiment of the present invention, the second light beam C converges within a predetermined object distance range.

Therefore, as shown in FIG. 2B, the light beam cross section of the second light beam C can be decreased in the vicinity of the convergence point.

In particular, the field depth of the photograph optical system becomes extremely small in the near-distance range. However, since the second light beam C is brought to convergence within the distance measurement range, the distance to a small point can be precisely measured, and the focus of the camera can be brought to a desired point.

Even when a small object is to be photographed, the second light beam C rarely spreads outside the object, and light components reflected by objects other than the object to be photographed can be eliminated, thus greatly improving the distance measurement precision.

In a distance measuring device according to still another embodiment of the present invention, the exit position of the second light beam C is set to be closer to the distance measurement axis T than that of the first light beam B.

Since the first light beam B is projected in the direction substantially parallel to the distance measurement axis T, small parallax of the distance measuring portion is assured over a broad range from the middle distance to infinity (in practice, the distance the light beam can travel).

On the other hand, since the second light beam C is projected in the direction crossing the distance measurement axis T, the small parallax range of the distance measuring portion is limited to a narrow range in the vicinity of the crossing point.

As shown in FIG. 3, when the exit position of the second light beam C is brought close to the distance measurement axis T, the angle the second light beam C and the distance measurement axis T make becomes small, and the small parallax range can be broadened.

Hence, when the exit position of the second light beam C is brought closer to the distance measurement axis T than that of the first light beam B, the first and second light beams B and C can be balanced in association with the small parallax range.

In a distance measuring device according to still another embodiment of the present invention, light irradiated by an irradiation unit forms the first and second light beams B and C when it passes through two lenses.

In this case, axes that connect the principal points of the respective projecting lenses and the irradiation unit correspond to the exit directions of the first and second light beams B and C, respectively.

In a distance measuring device according to still another embodiment of the present invention, light irradiated by the irradiation unit is split into the first and second light beams B and C via a splitting unit such as a half prism and the like.

In this case, the exit directions after a light beam is split correspond to those of the first and second light beams B and C.

In a distance measuring device according to still another embodiment of the present invention, light beams irradiated by two irradiation units form the first and second light beams B and C when they pass through a single lens.

In this case, axes that connect the respective irradiation units and the principal point of a projecting lens correspond to the exit directions of the first and second light beams B and C, respectively.

In a distance measuring device according to still another embodiment of the present invention, an aperture mask is arranged in front of one irradiation unit.

Since one lens is shared, the exit pupil of the second light beam C alone cannot be decreased by, e.g., a method of setting different lens diameters.

However, when the aperture mask is arranged in front of the irradiation unit for the second light beam C, the exit pupil of the second light beam C can be decreased.

In a distance measuring device according to still another embodiment of the present invention, the "optical path of the first light beam B" outside a predetermined object distance range is seen through from the finder, and a "first mark for measuring of an object distance (to be referred to as a distance measurement mark hereinafter)" is displayed on the see-through portion.

Also, the "optical path of the second light beam C" within the predetermined object distance range is seen through from the finder, and a "second distance measurement mark" is displayed on the see-through portion.

Accordingly, when the photographer sets the optical image of an object located outside the predetermined object distance range to be superposed on the "first distance measurement mark" on the finder, the distance to the object can be accurately detected.

Similarly, when the photographer sets the optical image of an object located within the predetermined object distance range to be superposed on the "second distance measurement mark" on the finder, the distance to the object can be accurately detected.

In a distance measuring device according to still another embodiment of the present invention, the "first distance measurement mark" and the "second distance measurement mark" to be displayed are automatically switched.

In general, when the shift amount of the photograph optical system is changed or the focal length is switched, the focal plane (a plane in the object space conjugate with the imaging surface via the photograph optical system) moves. At this time, the object to be photographed by the photographer may be located in the neighborhood of the focal plane or in the moving direction of the focal plane independently of the automatic or manual focusing mode.

When the "first distance measurement mark" and the "second distance measurement mark" to be displayed are switched in response to the shift amount or the focal length, the distance measurement mark can be displayed in correspondence with the object to be photographed.

In this case, for example, when the focal plane falls outside the predetermined object distance range, the "first distance measurement mark" is displayed; otherwise, the "second distance measurement mark" is displayed.

On the other hand, the distance detecting circuit 4 detects the distance to the object. The object to be photographed of the photographer may be located in the vicinity of the object distance except for the case of a complicated frame layout.

When the "first distance measurement mark" and the "second distance measurement mark" to be displayed are switched in accordance with the detected object distance value, the distance measurement mark can be displayed in correspondence with the object to be photographed.

In this case, for example, when the "detected object distance value" falls outside the predetermined object distance range, the "first distance measurement mark" is displayed; otherwise, the "second distance measurement mark" is displayed.

In this manner, when the distance measurement mark to be displayed is switched in accordance with the "focal length of the photograph optical system", the "shift amount of the photograph optical system", or the "object distance detected by the distance detecting circuit 4", a distance measurement mark suitable for the object to be photographed can be automatically selected.

In a distance measuring device according to still another embodiment of the present invention, the first and second light beams B and C to be produced are switched in correspondence with the shift amount or focal length of the photograph optical system.

When the shift amount of the photograph optical system is changed or the focal length is switched, the focal plane of the photograph optical system moves. Normally, the object to be photographed by the photographer may be located in the neighborhood of the focal plane or in the moving direction of the focal plane independently of the automatic or manual focusing mode.

Accordingly, an appropriate light beam to be irradiated onto the object to be photographed can be selectively produced in accordance with the shift amount or the focal length.

When the first and second light beams B and C are automatically selectively produced, reflected light (noise components) due to an unwanted light beam can be eliminated while reducing the power consumption amount, and the distance measurement precision can be further improved.

In this case, for example, when the focal plane is located outside the predetermined object distance range, the first light beam B is irradiated; otherwise, the second light beam C is irradiated.

In a distance measuring device according to still another embodiment of the present invention, the first projecting unit projects a first light beam used for measuring distance within a first distance range from an object distance that can be considered as infinity to a first closest distance.

A first receiving unit receives reflected light of the first light beam reflected by an object within the first distance range.

On the other hand, a second projecting unit projects a second light beam used for measuring distance within a second distance range from a second closest distance closer than the first closest distance to a distance in the vicinity of the first closest distance.

A second receiving unit receives reflected light of the second light beam reflected by an object within the second distance range.

A distance detecting circuit detects the distance to the object on the basis of the receiving angle or receiving position of the reflected light received by the first or second receiving unit.

FIG. 14 is a view for explaining still another embodiment of the present invention.

In a distance measuring device according to still another embodiment of the present invention, a projecting unit 73 projects a low-profile, planar light beam E toward a set distance measuring portion G.

The planar light beam E crosses the distance measuring portion G while its spread is limited in the direction of thickness of the light beam section, as shown in FIG. 14.

In this way, since the planar light beam E crosses the distance measuring portion G, an object located on the distance measuring portion G is directly illuminated by the planar light beam E. Since the distance to the illuminated portion of the object is actually measured, the set distance measuring portion G is not offset from the actual distance measuring portion, and parallax can be eliminated in the vicinity of the distance measuring portion G.

Also, since the light beam shape of the planar light beam E has a spread in the longitudinal direction of the light beam cross section, a broad range before and after the distance measuring portion G as the crossing point can be illuminated as compared to a rod-like light beam with a decreased beam diameter. Therefore, the distance measurement range that can maintain small parallax can be broadened.

On the other hand, since the planar light beam E has a light beam shape, the spread of which is limited in the direction of thickness of the light beam section, the area of the light beam section can be reduced. Therefore, the number of light components spreading outside the object to be measured can be decreased, and noise components returning from objects other than the object to be measured can be reduced. For this reason, the detection precision of the receiving angle or receiving position on a receiving unit 74 can be improved, and the distance measurement precision of the distance measuring device as a whole can be improved.

As described above, the light beam shape of the planar light beam E is suitable for attaining both a "distance measurement range with small parallax" and a "distance measurement precision", and has merits that cannot be obtained by the rod-like light beam of earlier technology.

In a distance measuring device according to still another embodiment of the present invention, a low-profile, planar light beam E is projected. The planar light beam E is projected in a direction crossing the entire specific section Y set on the distance measurement axis T, as shown in FIG. 15.

Therefore, the irradiation surface of the planar light beam E is reliably formed on the distance measurement axis T in case of an object located within the specific section.

In general, the projected image of the distance measurement axis T overlaps a set distance measuring portion I on the photograph frame in case of ignoring the aberrations out of the axis of the optical system of photograph 72.

Accordingly, the object located within the specific section is free from any parallax associated with the distance measuring portion since the "irradiation surface of the planar light beam E" matches the position of the "set distance measuring portion I" on the photograph frame.

In this fashion, when the photographer sets the object within the specific section on the distance measurement axis T by adjusting the direction of a camera 71, the distance to the object can be measured without causing any parallax.

When the entire specific section Y is illuminated by a rod-like light beam of earlier technology, as described above, the light beam cross section of the rod-like light beam must be extremely widened as the specific section is prolonged.

When the light beam cross section of the rod-like light beam is widened, the number of noise light components reflected by objects other than the object to be measured increases, thus considerably impairing the distance measurement precision.

Also, since a large radiation angle of the rod-like light beam must be set to widen the light beam cross section, the spread loss of the rod-like light beam extremely increases. For this reason, the amount of reflected light received by the receiving unit 74 decreases, and the distance measurement precision lowers considerably.

However, since the distance measuring device of FIG. 15 uses the planar light beam E, the spread of the light beam section can be suppressed as much as possible, and the entire specific section can be efficiently illuminated.

Consequently, the number of light components extending outside the object is decreased, and noise light returning from objects other than the object to be measured can be reduced. Since the light beam section has a small radiation angle (solid angle), the spread loss of the light beam can be minimized, and the amount of light received by the receiving unit 74 can be increased.

For these reasons, the distance measuring device of FIG. 15 can obtain high distance measurement precision.

When the set distance measuring portion I is a point having no area, the distance measurement axis T that connects the distance measuring portion and an object-side principal point H of the photograph optical system is defined by a straight line.

On the other hand, when the set distance measuring portion G has a certain width such as an allowable range, the distance measurement axis T that connects the distance measuring portion G and the object-side principal point H of the photograph optical system is defined by a cone which has the object-side principal point H as a vertex. In this case, the planar light beam E is projected within the range in which the light beam crosses this cone (distance measurement axis T).

In a distance measuring device according to still another embodiment of the present invention, a light beam irradiated from a light emitting unit passes through a projecting optical system, and is then projected toward an object via a nearly rectangular or elliptic exit pupil.

When the light beam exits the nearly rectangular or elliptic exit pupil, the light beam shape is shaped into a planar shape.

Since the longitudinal direction of the exit pupil is set in a direction crossing the distance measurement axis T, the planar light beam E is projected along a "plane A2 including the exit position of the light beam and the distance measurement axis T". Such planar light beam E crosses the distance measurement axis T over a range before and after the distance measuring portion G, as shown in FIG. 15.

By appropriately adjusting the radiation direction and radiation angle, on the plane, of such planar light beam E, the position and width of the specific section can be freely set on the distance measurement axis T.

In a distance measuring device according to still another embodiment of the present invention, a planar light beam E irradiated from a nearly rectangular or elliptic light emitting surface is projected toward an object via a projecting optical system.

Since the longitudinal direction of the light emitting surface is set in a direction crossing the distance measurement axis T, the planar light beam E is projected along a "plane A2 including the exit position of the light beam and the distance measurement axis T". Such planar light beam E crosses the distance measurement axis T over a range before and after the distance measuring portion G, as shown in FIG. 15.

By appropriately adjusting the radiation direction and radiation angle, on the plane, of such planar light beam E, the position and width of the specific section can be freely set on the distance measurement axis T.

In a distance measuring device according to still another embodiment of the present invention, a planar light beam E converges in its direction of thickness in a specific section, as indicated by a projected image A3, in the direction of thickness, of the planar light beam E in FIG. 16.

In the vicinity of the convergence point, the width, in the direction of thickness, of the planar light beam E decreases, and the light beam cross section can be set to be smaller.

For this reason, the number of light components spreading outside the object to be measured is decreased, and noise light returning from objects other than the object to be measured can be reduced. Also, in the vicinity of the convergence point, since the planar light beam E is brought to a focus in its direction of thickness, the irradiation light amount increases, and the amount of reflected light received by the receiving unit 74 increases.

For these reasons, the distance measurement precision can be further improved.

In a distance measuring device according to still another embodiment of the present invention, the specific section is seen through from the finder, and a distance measurement mark is displayed on the see-through portion.

For example, the photographer sets an object in the finder which may be located within the distance range of the specific section, and superposes the field image of the object on the distance measurement mark. With this collimation, the object can be adequately located on the specific section, and the distance to the object can be detected without causing any parallax.

FIG. 17 is an explanatory view showing still another embodiment of the present invention.

In a distance measuring device according to still another embodiment of the present invention, the receiving unit 74 is set outside the plane A2 including the exit position of the projecting unit 73 and the distance measurement axis T. A planar region R seen from this setting position is not located in the same plane as the planar light beam E.

The planar region R and the planar light beam E commonly include a specific section on the distance measurement axis T.

With this arrangement, as shown in FIG. 17, the planar region R and the planar light beam E obliquely cross each other on the distance measurement axis T, and the crossing region includes the "specific section on the distance measurement axis T".

Of reflected light components of the planar light beam E, only reflected light components generated in this crossing region are received by the receiving unit 74. Accordingly, the distance to only an object located within the crossing area (in the vicinity of the specific section) is measured.

In this way, since the distance measuring region is limited to a region in the vicinity of the specific section, the distance to a small point can be precisely measured, and the focus of the camera can be brought to early one desired point.

Since none of "reflected light components of the planar light beam E" generated outside the crossing region are received by the receiving unit 74, reflected light components generated by objects other than the object to be measured can be greatly reduced, and the distance measurement precision can be improved dramatically.

In a distance measuring device according to still another embodiment of the present invention, reflected light passing through a receiving optical system is received by a nearly rectangular or elliptic receiving surface.

Since the longitudinal direction of the receiving surface is set in a direction crossing the distance measurement axis T, the planar region R seen from the receiving optical system is formed along a "plane including the receiving position of reflected light and the distance measurement axis T".

Such planar region R obliquely crosses the distance measurement axis T. By appropriately setting the receiving angle and receiving direction, on the plane, of the planar region R, the entire specific section on the distance measurement axis T can be desirably included in the planar region R.

In a distance measuring device according to still another embodiment of the present invention, a receiving element detects the receiving position in a direction substantially parallel to the direction of thickness of the planar light beam E.

In general, the crossing region between the planar light beam E and the planar region R has roughly a quadrangular prism shape. More specifically, the receiving element receives roughly a rectangular light point corresponding to the crossing portion between reflected light of the planar light beam E and a receiving element array.

A PSD (position sensor device) normally used as the receiving element detects the barycentric position of the illuminance distribution as a displacement.

For this reason, when the receiving position of the rectangular light point is detected in the diagonal direction, since the illuminance distribution has a large width, measurement errors of the receiving position increase.

On the other hand, when the receiving position is detected in the direction substantially parallel to the direction of thickness of the planar light beam E, the width of the illuminance distribution in the detection direction of the displacement becomes small, and measurement errors of the receiving position can be reduced.

Therefore, when the detection direction of the receiving position (the displacement detection direction of the receiving element) is set to agree with the direction substantially parallel to the direction of thickness of the planar light beam E, the distance measurement precision of the distance measuring device can be improved.

In a distance measuring device according to still another embodiment of the present invention, the crossing angle, θ, between the planar light beam E and the planar region R is set within the range $60° \leq θ \leq 120°$.

Note that the spread of the crossing region with respect to the displacement detection direction is nearly inversely proportional to the sine value of the crossing angle θ. For this reason, as the crossing angle θ approaches zero or 180°, the size of the crossing region abruptly increases.

By limiting the crossing angle θ to fall within the range from 60° to 120° while avoiding the "range in which the size of the crossing region abruptly increases", the crossing region can be maintained to have a small size.

By maintaining the crossing region to have a small size, the distance to a small point can be precisely measured, and the focus of the camera can be brought to a desired point.

Also, by maintaining the crossing region to have a small size, reflected light components from objects other than the object to be measured generated within the crossing region can be further reduced, and the distance measurement precision can be still improved.

In a distance measuring device according to still another embodiment of the present invention, the crossing angle θ between the planar light beam E and the planar region R is set to be nearly a right angle.

Note that the size of the crossing region is nearly inversely proportional to the sine value of the crossing angle θ. For this reason, when the crossing angle θ is set to be nearly a right angle, the size of the crossing angle is minimized.

Accordingly, by setting the crossing angle e to be nearly a right angle, the size of the crossing angle can be minimized.

In this manner, by minimizing the size of the crossing region, the distance to a small point can be precisely measured, and the focus of the camera can be brought to a desired point.

Also, by minimizing the size of the crossing region, reflected light components from objects other than the object to be measured generated within the crossing region can be further reduced, and the distance measurement precision can be still improved.

FIG. 18 is a view for explaining still another embodiment of the present invention.

In a distance measuring device according to still another embodiment of the present invention, as shown in FIG. 18, the planar light beam E is flattened in a direction D2 substantially parallel to a detection direction D1 of the receiving angle or receiving position on the receiving unit 74.

By flattening the planar light beam E in such direction, the width of the light point on the receiving surface can be decreased along the detection direction. Accordingly, the detection precision of the receiving unit 74 can be improved, and the distance measurement precision can be improved.

In a distance measuring device according to still another embodiment of the present invention, a second projecting unit is added to project a rod-like light beam in a direction substantially parallel to the distance measurement axis T.

Since the planar light beam E is projected toward the set distance measuring portion I, the parallax in the vicinity of the distance measuring portion G can be eliminated. For this reason, the light beam E is suitable for distance measurements within a narrow distance range.

On the other hand, since the rod-like light beam is projected in the direction substantially parallel to the distance measurement axis T, the parallax between the set and actual distance measuring portions is eliminated as the distance becomes larger. For this reason, the rod-like light beam is suitable for distance measurements over a broad distance range from middle to far distances.

In this way, when the planar light beam E and the rod-like light beam are projected, the planar light beam E is used in distance measurements for a specific narrow distance range (e.g., distance measurements in the macro photograph mode), and the rod-like light beam is used in distance measurements in a broad distance range (e.g., distance measurements in the ordinary photograph mode).

BRIEF DESCRIPTION OF THE DRAWINGS

FIG. 1 is an explanatory view showing the present invention;

FIG. 27 is a flow chart for explaining the operation of the seventh embodiment;

DESCRIPTION OF THE PREFERRED EMBODIMENTS

The preferred embodiments of the present invention will be described hereinafter with reference to the accompanying drawings.

Figure 4:
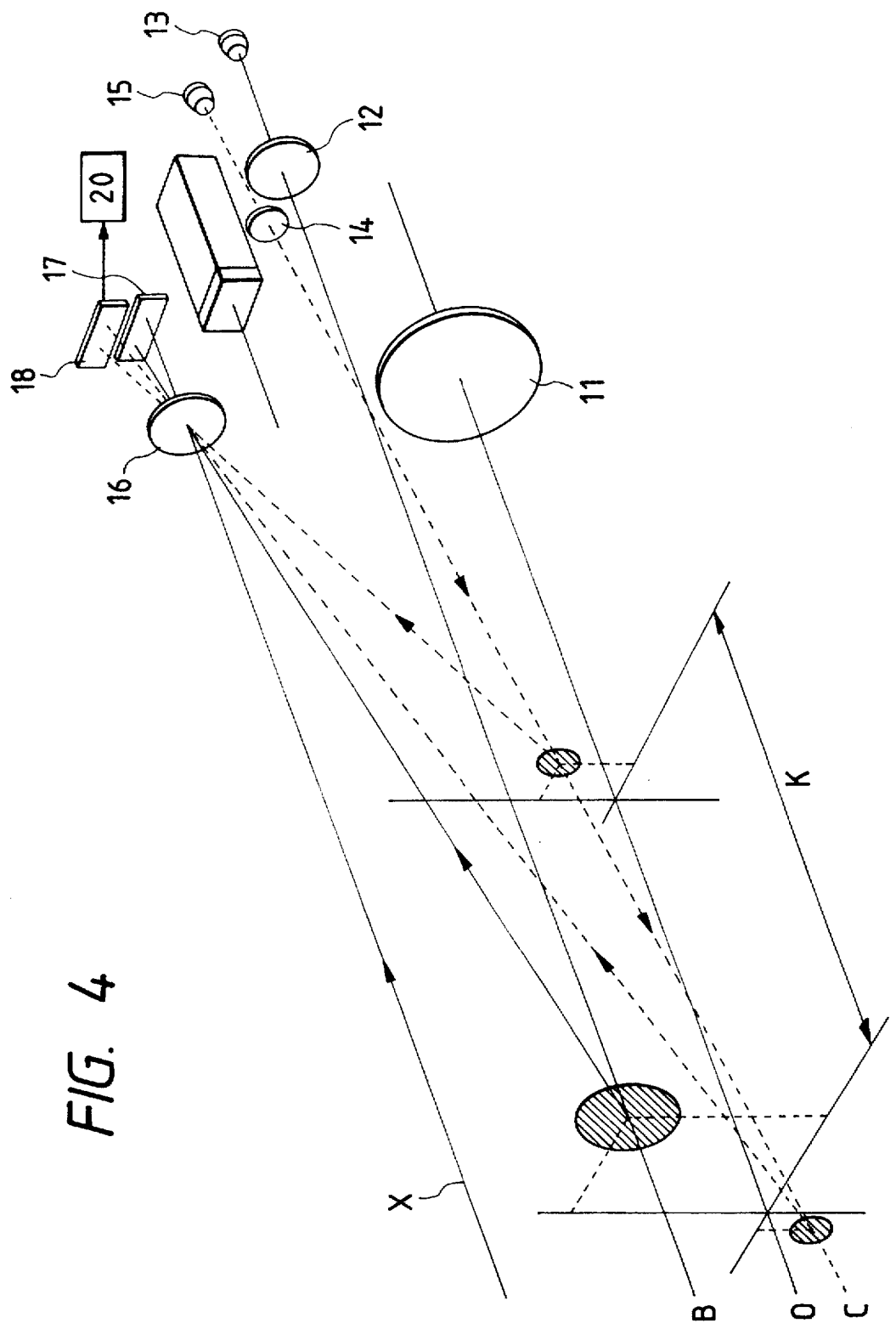
FIG. 4 is a view showing the first embodiment of the present invention.

FIG. 4 is a view showing the first embodiment of the present invention.

Figure 5:
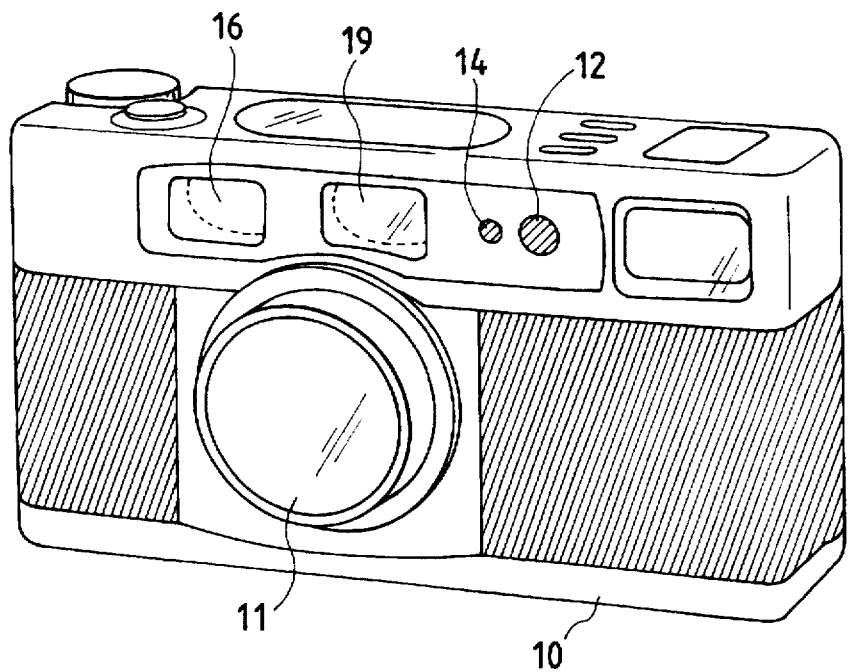
FIG. 5 is a view showing the outer appearance of the first embodiment.

FIG. 5 shows the outer appearance of the first embodiment.

Referring to FIGS. 4 and 5, an optical system 11 of photograph (to be referred to as a photograph optical system 11 hereinafter) is attached to the front surface of a camera 10, and a projecting lens 12 is arranged at the upper right position, on the front surface, above the photograph optical system 11. A light emitting element 13 is arranged behind the projecting lens 12.

Another projecting lens 14 is arranged in the neighborhood of the projecting lens 12, and another light emitting element 15 is arranged behind the light output lens 14.

A receiving lens 16 is arranged at the upper left position, on the front surface, above the photograph optical system 11, and receiving elements 17 and 18 comprising, e.g., PSDs (position sensor devices) and the like are arranged behind the receiving lens 16 to be vertically offset from each other. The receiving elements 17 and 18 are connected to a part 20 for detecting a distance (to be referred to as a distance detecting part 20 hereinafter).

The positional relationship among these constituting elements will be described in detail below.

An axis that connects: the principal point of the projecting lens 12 and the light emitting element 13 extends in a direction substantially parallel to an optical axis O of the photograph optical system 11, and an axis that connects the principal point of the projecting lens 14 and the light emitting element 15 substantially crosses the optical axis O in the macro region of the photograph optical system 11.

The projecting lens 14 is formed to have a smaller lens diameter than that of the projecting lens 12. The projecting lens 14 is preferably arranged to be closer to the optical axis O of the photograph optical system 11 than the projecting lens 12.

The position of the light emitting element 15 is determined, so that a second light beam C output from the projecting lens 14 converges within the macro region.

Note that the first projecting unit 1 corresponds to the projecting lens 12 and the light emitting element 13, the second projecting unit 2 corresponds to the projecting lens 14 and the light emitting element 15, the receiving unit 3 corresponds to the receiving lens 16, and the receiving elements 17 and 18, the distance detecting circuit 4 corresponds to the distance detecting part 20, the distance measurement axis T corresponds to the optical axis O, and the "predetermined object distance range" corresponds to the macro region.

Also, the first projecting unit corresponds to the projecting lens 12 and the light emitting element 13, the second projecting unit corresponds to the projecting lens 14 and the light emitting element 15, the first receiving unit corresponds to the receiving lens 16 and the receiving element 17, the second receiving unit corresponds to the receiving lens 16 and the receiving element 18, the distance detecting circuit corresponds to the distance detecting part 20, the first distance range corresponds to an ordinary photograph region, and the second distance range corresponds to the macro region.

The distance measuring operation in the first embodiment will be described below.

Irradiation light emitted by the light emitting element 13 is shaped into a first light beam B via the projecting lens 12, and the light beam B is projected in a direction substantially parallel to the optical axis O.

Figure 2A:
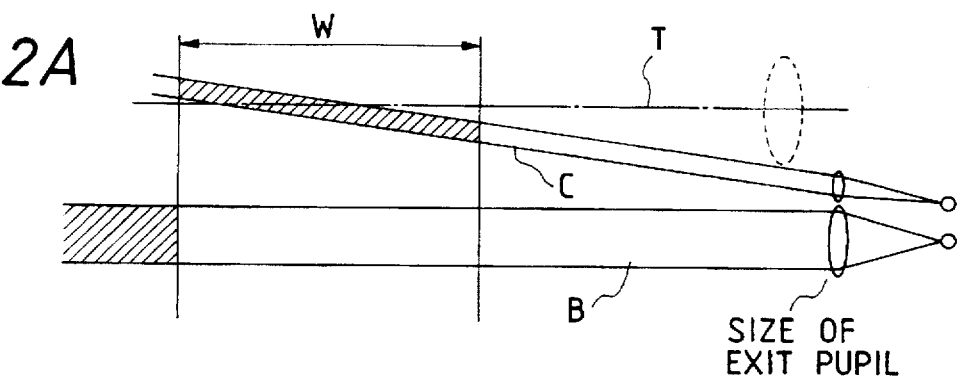
FIGS. 2A, 2B and 2C are views for explaining an embodiment of the present invention.
Figure 2B:
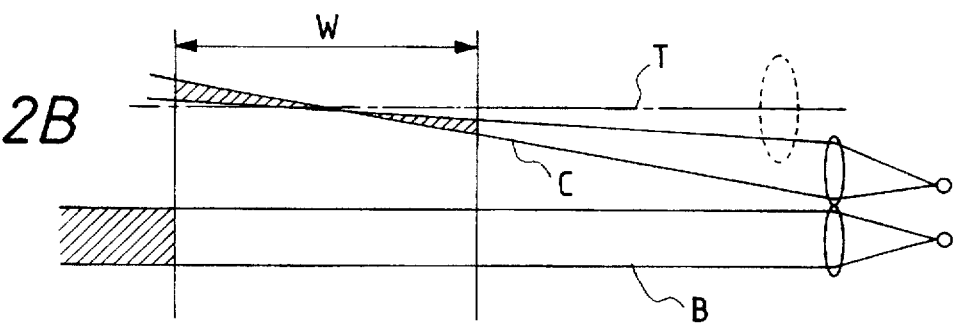
Figure 2C:
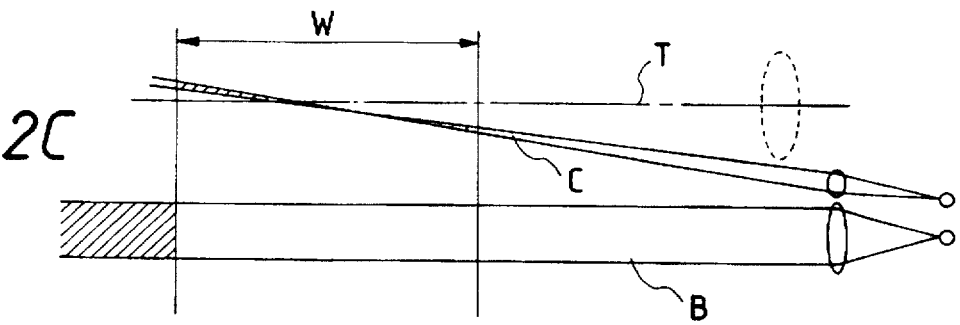
Figure 3:
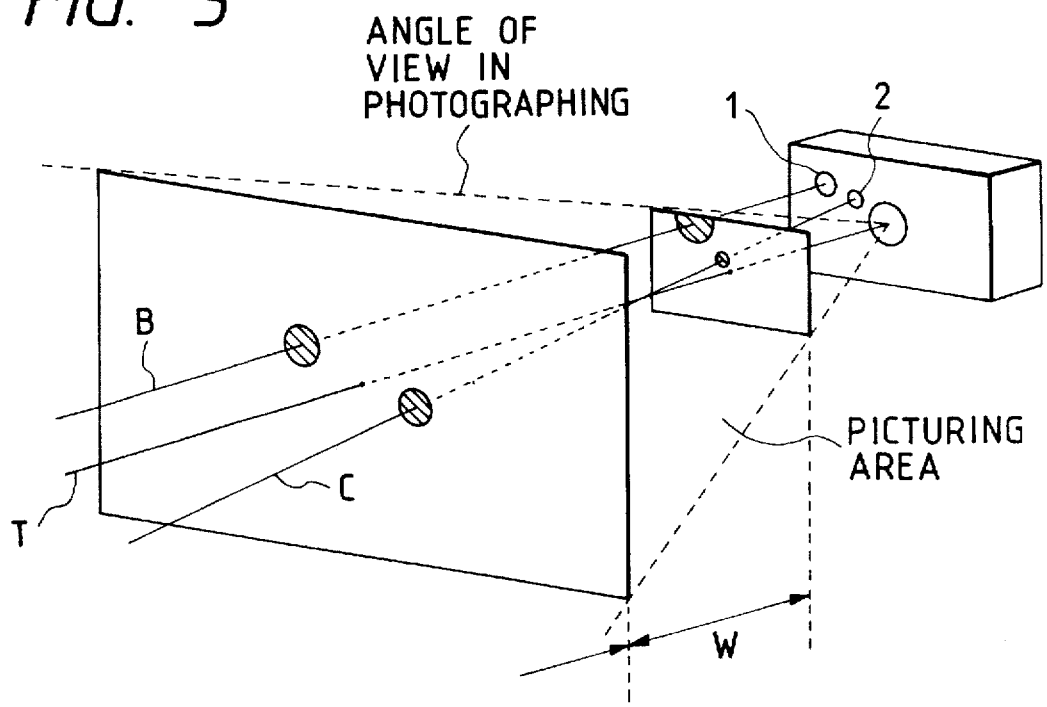
FIG. 3 is a view for explaining another embodiment of the present invention.

On the other hand, irradiation light emitted by the light emitting element 15 is shaped into a second light beam C via the projecting lens 14. The second light beam C substantially crosses the optical axis O in the macro region. Note that the exit pupil (in this case, the lens diameter of the projecting lens 14) of the second light beam C is smaller than that of the first light beam B, and the second light beam C converges in the macro region. For this reason, as shown in FIG. 2C, the light beam cross section of the second light beam C in the macro region is clearly smaller than that of the first light beam B.

Also, since the projecting lens 14 is set closer to the optical axis O, an angle formed by the second light beam C and the optical axis O make is small, and the second light beam C propagates along the vicinity of the optical axis O over a broad range.

When these two light beams are projected, the second light beam C is reflected by an object located near the center of the photograph frame in the macro region, and reflected light is received by the receiving element 18 via the receiving lens 16.

On the other hand, in a region farther than the macro region, the first light beam B is reflected by an object located near the center of the photograph frame, and reflected light X is received by the receiving element 17 via the receiving lens 16.

The distance detecting part 20 performs trigonometric measurement calculations or the like on the basis of the receiving position of the reflected light on the receiving element 17 or 18, and obtains the distance to the object.

With the above operation, in the first embodiment, since the optical axis O of the photograph optical system 11 and the second light beam C cross in the macro region, the parallax between the set and actual distance measuring portions in the vicinity of the crossing point can be greatly eliminated.

Accordingly, by projecting the second light beam C, the parallax between the set and actual distance measuring portions in the macro region, which causes large parallax between the set and actual distance measuring portions when it is illuminated by only the first light beam B, can be eliminated.

Since the lens diameter of the projecting lens 14 is set to be smaller than that of the projecting lens 12, and the convergence position of the second light beam C is set in the macro region, the light beam section, in the macro region, of the second light beam C can be greatly decreased.

Normally, since the field depth of the photograph optical system 11 is extremely small in the macro photograph mode, distance measurements at a small point are required. Since the light beam cross section of the second light beam C in the first embodiment can be greatly decreased, the light beam C is suitable for measuring the distance to a small point.

Even when a small object is to be photographed, the second light beam C hardly spreads outside the object, and light components reflected by objects other than the object to be photographed can be reduced. In this way, the distance measurement precision can be greatly improved.

Furthermore, since the projecting position of the second light beam C is set closer to the optical axis O of the photograph optical system 11, the "small-parallax range" in the macro region can be broadened.

In the first embodiment, the projecting lenses 12 and 14 are horizontally juxtaposed. However, the present invention is not limited to this specific layout. For example, the projecting lens 14 may be arranged, as shown in FIGS. 6B to 6D.

Figure 6A:
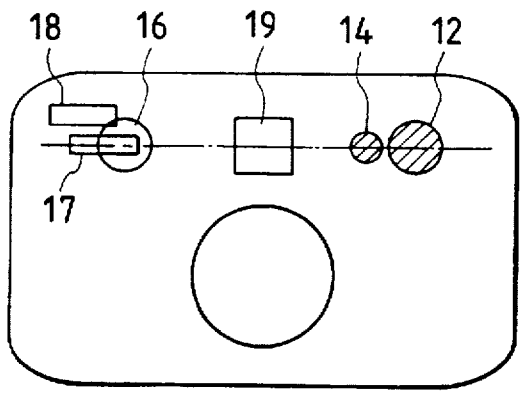
FIGS. 6A, 6B, 6C and 6D are front views showing layout examples of a projecting lens.
Figure 6B:
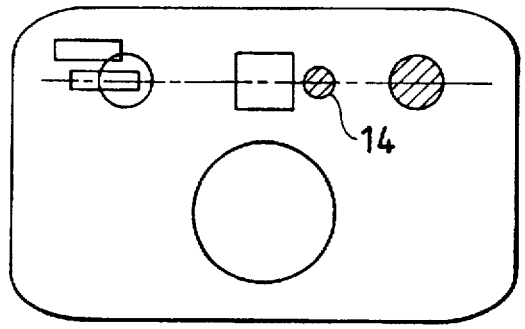

More specifically, in FIG. 6B, the projecting lens 14 is arranged adjacent to a finder 19. In this arrangement, the parallax between the finder 19 and the projecting lens 14 can be eliminated, and the offset between a mark for measuring of an object distance (to be referred to as a distance measurement mark hereinafter) indicated in the finder 19 and the actual distance measuring portion can be decreased.

Figure 6C:
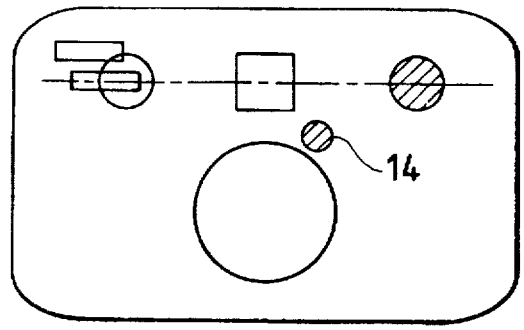

In FIG. 6C, the projecting lens 14 is arranged adjacent to the photograph optical system 11. In this arrangement, the parallax between the finder 19 and the photograph optical system 11 can be eliminated, and the offset between the center of the photograph frame and the distance measuring portion can be reduced. In this case, since the interval (base length) between the projecting lens 14 and the receiving lens 16 is shortened, it is difficult to assure distance measurement precision in distance measurements of far distances. However, since the projecting lens 14 is used for projecting light onto the macro region, a sufficiently distance measurement precision can be assured even when the base length is small.

Figure 6D:
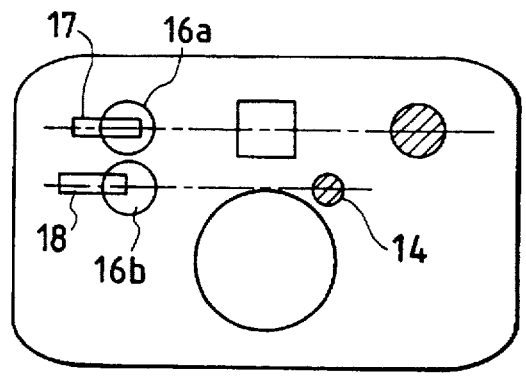

Furthermore, in FIG. 6D, a receiving lens 16a is arranged adjacent to the projecting lens 12, and a receiving lens 16b is arranged adjacent to the projecting lens 14. In this manner, when the receiving lens 16b is displaced downward in correspondence with the position of the projecting lens 14, reflected light (mainly, regularly reflected light) of the second light beam C, which returns along the optical axis direction, can be perpendicularly strongly received, and the distance measurement precision in the macro region can be further improved.

Another embodiment will be described below.

Figure 7:
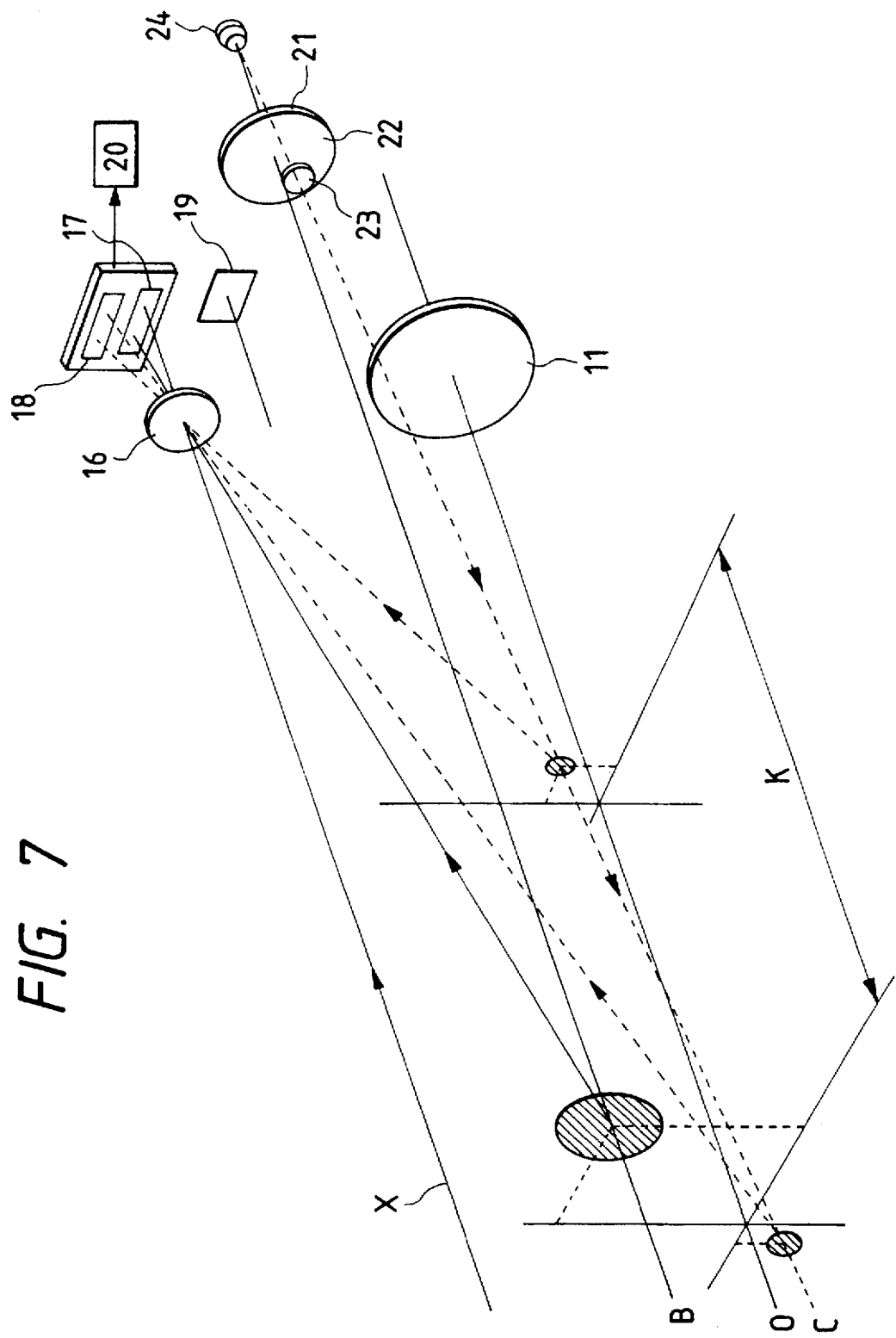
FIG. 7 is a view showing the second embodiment of the present invention.

FIG. 7 is a view showing the second embodiment.

The arrangement of the second embodiment is characterized in that a compound lens 21 consisting of projecting lenses 22 and 23 is arranged at the upper right position, on the front surface, above the photograph optical system 11, and a light emitting element 24 is arranged behind the compound lens 21.

Note that the same reference numerals in FIG. 7 denote constituting elements common to those in the first embodiment, and a detailed description thereof will be omitted.

The positional relationship among these constituting elements will be described in detail below.

An axis that connects the principal point of the projecting lens 22 and the light emitting element 24 extends in a direction substantially parallel to the optical axis O of the photograph optical system 11, and an axis that connects the principal point of the projecting lens 23 and the light emitting element 24 substantially crosses the optical axis O in a macro region K of the photograph optical system 11.

The projecting lens 23 is formed to have a smaller lens diameter than that of the projecting lens 22, and is arranged to be closer to the optical axis O of the photograph optical system 11 than the projecting lens 22.

In order to converge the second light beam C output from the projecting lens 23 in the macro region, the light emitting element 24 is arranged at a position conjugate with the convergence point via the projecting lens 23.

Note that the first projecting unit 1 corresponds to the projecting lens 22 and the light emitting element 24, the second projecting unit 2 corresponds to the projecting lens 23 and the light emitting element 24, the receiving unit 3 corresponds to the receiving lens 16, and the receiving elements 17 and 18, the distance detecting circuit 4 corresponds to the distance detecting part 20, the distance measurement axis T corresponds to the optical axis O, and the "predetermined object distance range" corresponds to the macro region.

Also, the irradiation unit corresponds to the light emitting element 24, and the two lenses correspond to the projecting lenses 22 and 23.

With this arrangement, the second embodiment can provide the same effect as in the first embodiment.

Furthermore, as an effect unique to the second embodiment, the arrangements of the first and second projecting units 1 and 2 can be simplified using the combination of the light emitting element 24 and the compound lens 21. Therefore, the number of parts of the camera (distance measuring device) can be decreased, and easier assembly can be assured.

Still another embodiment will be described below.

Figure 8:
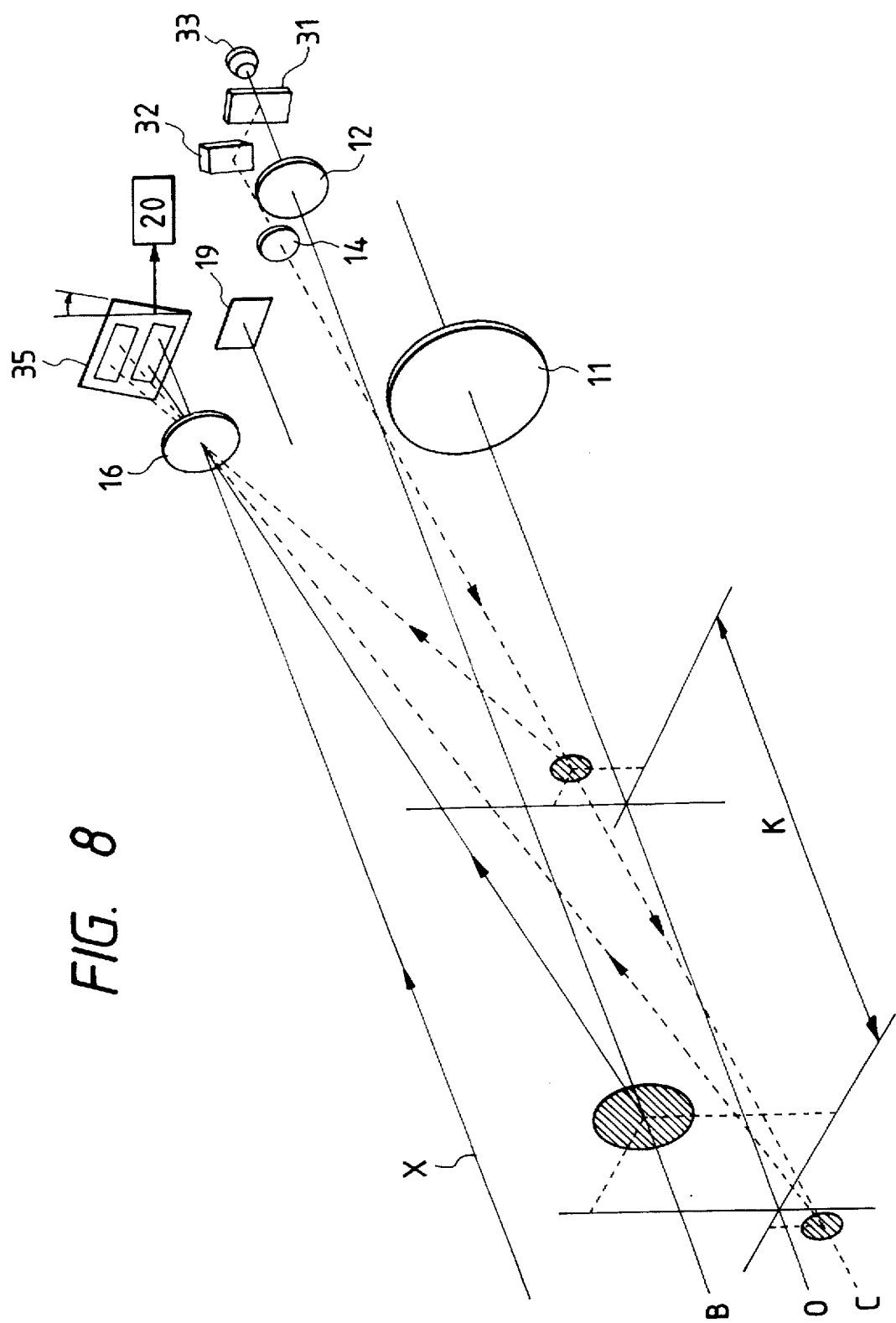
FIG. 8 is a view showing the third embodiment of the present invention.

FIG. 8 is a view showing the third embodiment.

The arrangement of the third embodiment is characterized in that a half mirror 31 and a light emitting element 33 are arranged in turn behind the projecting lens 12, and a mirror 32 is arranged behind the projecting lens 14. Also, a PSD element 35 prepared by forming the receiving elements 17 and 18 on a single circuit board is arranged behind the receiving lens 16.

Note that the same reference numerals in FIG. 8 denote constituting elements common to those in the first embodiment, and a detailed description thereof will be omitted.

The positional relationship among these constituting elements will be described in detail below.

An axis that connects the light emitting element 33 and the principal point of the projecting lens 12 extends in a direction substantially parallel to the optical axis O of the photograph optical system 11, and an axis that connects the principal point of the projecting lens 14 via the light emitting element 33, projecting lens 14, and mirror 32 in turn substantially crosses the optical axis O in the macro region of the photograph optical system 11.

The projecting lens 14 is formed to have a smaller lens diameter than that of the projecting lens 12, and is arranged to be closer to the optical axis O of the photograph optical system 11 than the projecting lens 12.

In order to converge the second light beam C output from the projecting lens 14 in the macro region, the light emitting element 33 is arranged at a position conjugate with the convergence point via the projecting lens 14. Furthermore, the PSD element 35 is arranged, so that its upper end is tilted backward.

Note that the first projecting unit 1 corresponds to the projecting lens 12 and the light emitting element 33, the second projecting unit 2 corresponds to the projecting lens 12, the mirror 32, the half mirror 31, and the light emitting element 33, the receiving unit 3 corresponds to the receiving lens 16 and the PSD element 35, the distance detecting circuit 4 corresponds to the distance detecting part 20, the distance measurement axis T corresponds to the optical axis O, and the "predetermined object distance range" corresponds to the macro region.

The irradiation unit corresponds to the light emitting element 33, and the splitting unit corresponds to the half mirror 31, the mirror 32, and the projecting lenses 12 and 14.

With this arrangement, the third embodiment can obtain the same effect as in the first embodiment.

Furthermore, as an effect unique to the third embodiment, since only one light emitting element 33 is arranged, a plurality of driving circuits for the light emitting element are not required, and the arrangement of the electrical system can be simplified.

In the third embodiment, the upper end of the PSD element 35 is tilted backward. With this arrangement, the reflected light of the second light beam C, which returns from a near-distance, obliquely lower position as compared to the reflected light of the first light beam B, can be efficiently brought to a focus as a clearer optical image on the upper side of the PSD element 35. Note that such arrangement in which the receiving element 18 is arranged behind the receiving element 17 can also be applied to other embodiments.

Still another embodiment will be described below.

Figure 9:
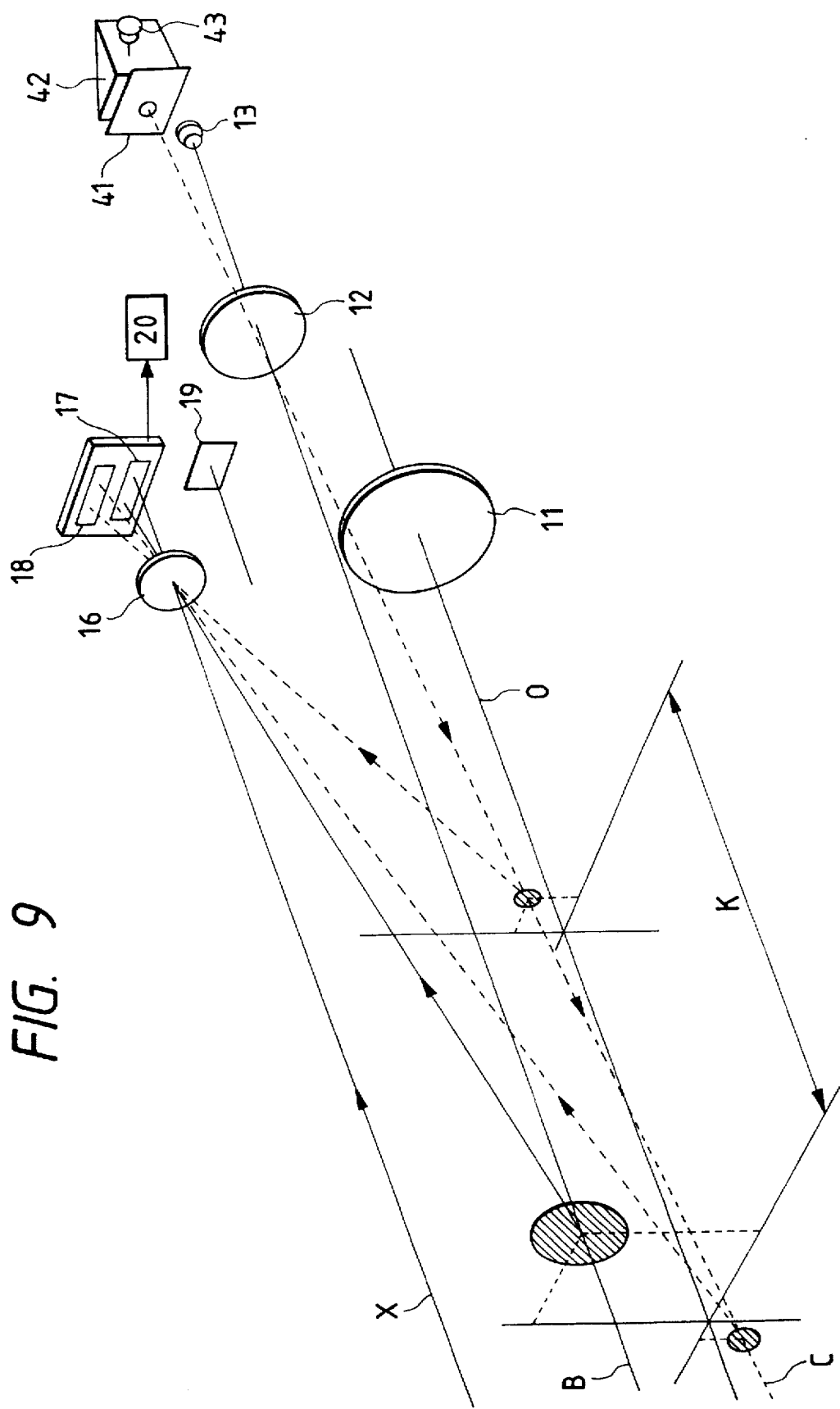
FIG. 9 is a view showing the fourth embodiment of the present invention.

FIG. 9 is a view showing the fourth embodiment.

The arrangement of the fourth embodiment is characterized in that the light emitting element 13 is arranged behind the projecting lens 12, and an aperture mask 41, a reflection member 42, and a light emitting element 43 are arranged adjacent to the light emitting element 13.

Note that the same reference numerals in FIG. 9 denote constituting elements common to those in the first embodiment, and a detailed description thereof will be omitted.

The positional relationship among these constituting elements will be described in detail below.

An axis that connects the principal point of the projecting lens 12 and the light emitting element 13 extends in a direction substantially parallel to the optical axis O of the photograph optical system 11, and an axis that connects the light emitting element 43, the reflection member 42, and the principal point of the projecting lens 12 substantially crosses the optical axis O in the macro region of the photograph optical system 11.

Figure 10:
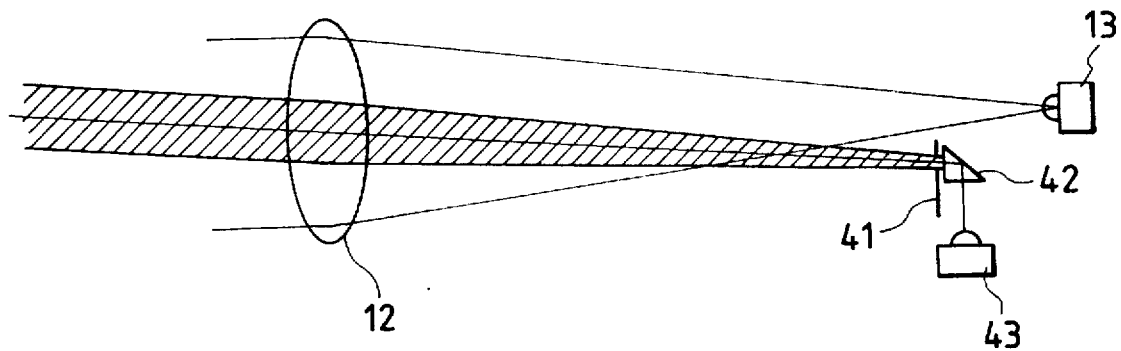
FIG. 10 is a view showing the projecting path in the fourth embodiment.

As shown in FIG. 10, the diameter of the aperture of the aperture mask is set, so that the beam size of a light beam that has passed through the aperture becomes smaller than the lens diameter of the projecting lens 12 at the position of the lens 12.

The reflection member 42 is used for preventing the light emitting elements 13 and 43 from spatially overlapping each other. If such problem associated with the space is not posed, the reflection member 42 may be omitted.

Note that the first projecting unit 1 corresponds to the projecting lens 12 and the light emitting element 13, the second projecting unit 2 corresponds to the projecting lens 12, the aperture mask 41, and the light emitting element 43, the receiving unit 3 corresponds to the receiving lens 16, and the receiving elements 17 and 18, the distance detecting circuit 4 corresponds to the distance detecting part 20, and the "predetermined object distance range" corresponds to the macro region.

Also, the two irradiation units correspond to the light emitting elements 13 and 43, and the lens corresponds to the projecting lens 12.

Furthermore, the aperture mask corresponds to the aperture mask 41.

With this arrangement, the fourth embodiment can obtain the same effect as in the first embodiment.

Furthermore, as an effect unique to the fourth embodiment, since only one projecting lens 12 is arranged, the camera can have a simple structure and outer appearance.

Still another embodiment will be described below.

Figure 11:
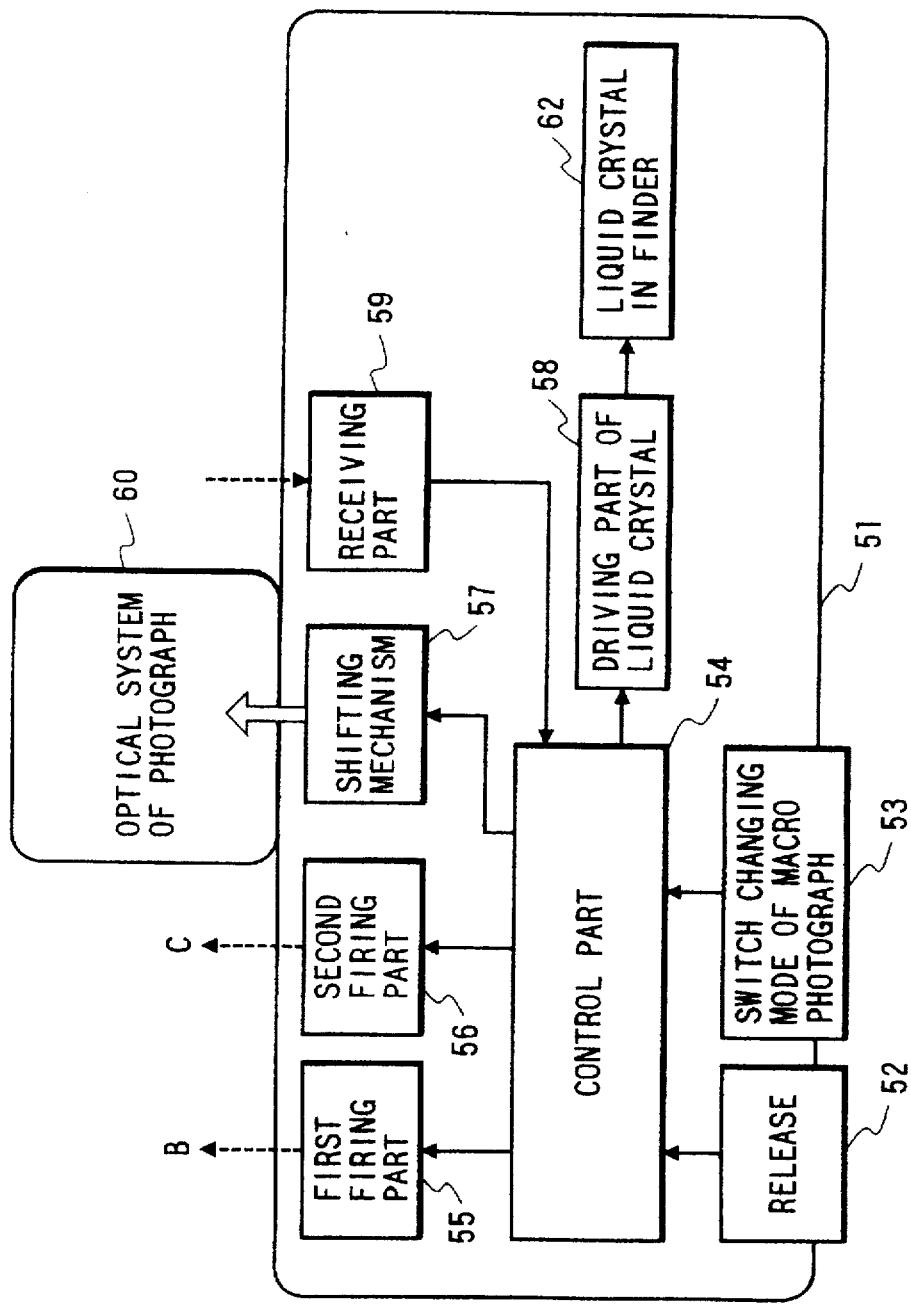
FIG. 11 is a view showing the fifth embodiment of the present invention.

FIG. 11 is a view showing the fifth embodiment.

In FIG. 11, a release button 52 and a switch 53 changing mode of macro photograph (to be referred to as a macro changing switch hereinafter) are arranged on the housing of a camera main body 51, and the output terminals of these switches are connected to a control part 54.

The output terminals of the control part 54 are independently connected to a first light emitting part 55, a second light emitting part 56, a shifting mechanism 57, and a driving part 58 of liquid crystal (to be referred to as a liquid crystal driving part hereinafter), and the input terminal of the control part 54 is connected to a receiving part 59.

The output direction of the first light emitting part 55 is parallel to an optical axis O of a photograph optical system 60, and the output direction of the second light emitting part 56 crosses the optical axis O in the macro region of the photograph optical system 60.

Figure 12A:
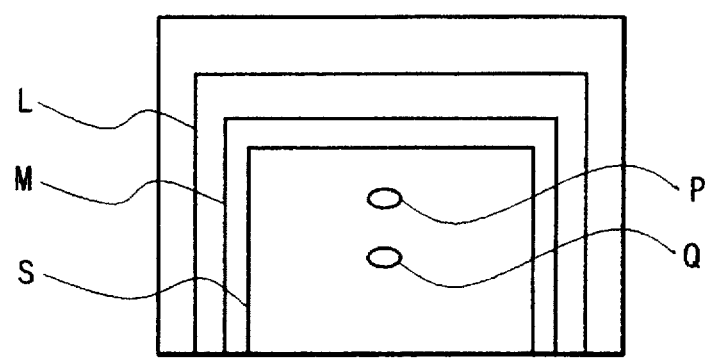
FIGS. 12A, 12B, 12C, 12D and 12E are views showing indications in a finder in the fifth embodiment.

The driving force for the shifting mechanism 57 is transmitted to the photograph optical system 60 via a lens mount part, and the output terminal of the liquid crystal driving part 58 is connected to a liquid crystal 62 in a finder. The liquid crystal 62 in the finder is formed in advance with indication patterns shown in FIG. 12A.

The first projecting unit 1 corresponds to the first light emitting part 55, the second projecting unit 2 corresponds to the second light emitting part 56, the receiving unit 3 corresponds to the receiving part 59, and the distance detecting circuit 4 corresponds to the control part 54.

The "first distance measurement mark" and "second distance measurement mark" correspond to distance measurement marks P and Q indicated on the liquid crystal 62 in the finder.

The indication switching circuit corresponds to the control part 54 and the liquid crystal driving part 58.

The lighting changing circuit corresponds to the control part 54.

Figure 13:
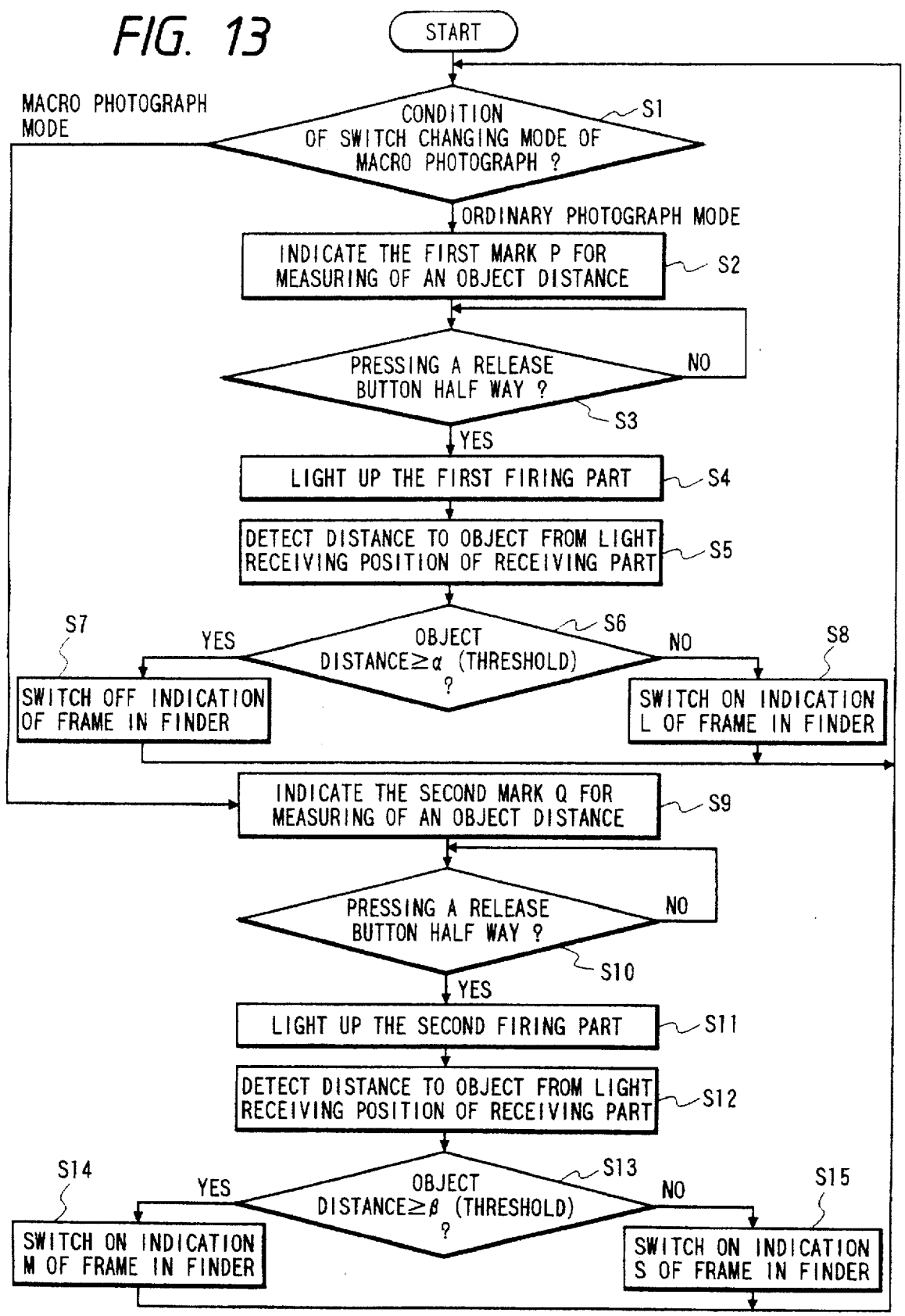
FIG. 13 is a flow chart for explaining the operation of the fifth embodiment.
Figure 14:
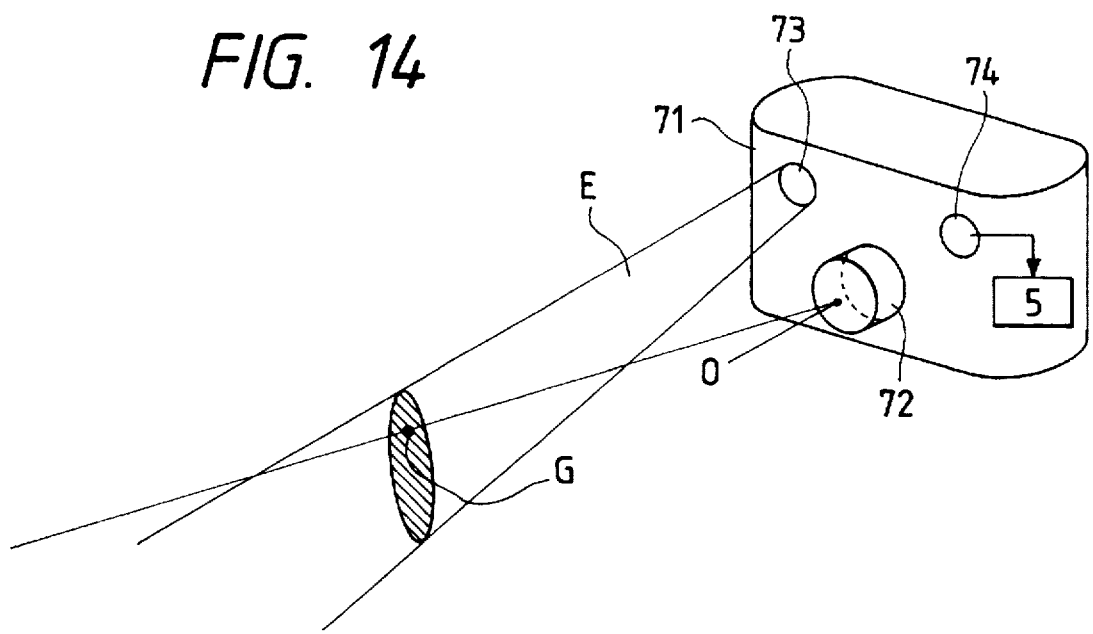
FIG. 14 is a view showing the present invention.

FIG. 13 is a flow chart for explaining the operation of the fifth embodiment.

The operation of the fifth embodiment will be described below with reference to these drawings.

The control part 54 reads the switch condition of the macro changing switch 53 to check if the current mode is the "macro photograph mode" or "ordinary photograph mode" (step S1).

If the current mode is the ordinary photograph mode, the control part 54 indicates the first distance measurement mark P in the finder, and quits indication of the second distance measurement mark Q (step S2).

If the release button 52 is pressed halfway in this state (step S3), the control part 54 turns on the first light emitting part 55, and turns off the second light emitting part 56 (step S4).

The receiving part 59 receives the reflected light of a light beam projected from the first light emitting part 55. The control part 54 detects the position, on the receiving element, of the reflected light, and calculates the distance to the object (step S5).

Figure 12B:
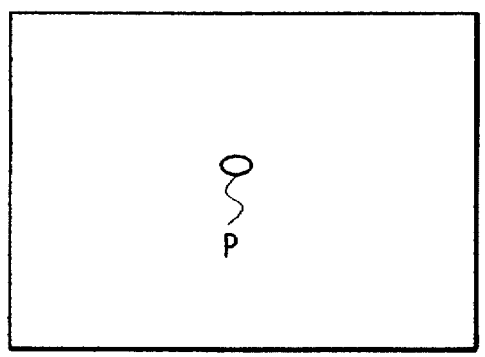

If the object distance is larger than a predetermined threshold a (step S6), the control part 54 switches off indications L, M, and S of frames, as shown in FIG. 12B (step S7).

Figure 12C:
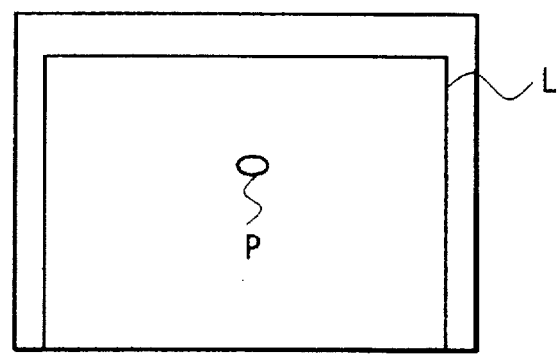

On the other hand, if the object distance is smaller than the predetermined threshold α, the control part 54 switches on the indication L of frame in the finder, as shown in FIG. 12C (step S8).

If the release button. 52 is pressed to its full-stroke position in this state, the shifting mechanism 57 drives the photograph optical system 60 in accordance with the distance measurement value. and subsequently. film exposure is performed.

On the other hand. if the current mode is the macro photograph mode. the control part 54 indicates the second distance measurement mark Q in the finder. and quits indication of the first distance measurement mark P (step S9).

If the release button 52 is pressed halfway in this state (step S10). the control part 54 turns on the second light emitting part 56, and turns off the first light emitting part 55 (step S11).

Subsequently. the receiving part 59 receives the reflected light of a light beam projected from the second light emitting part 56. The control part 54 detects the position. on the receiving element. of the reflected light. and calculates the distance to the object (step S12).

Figure 12D:
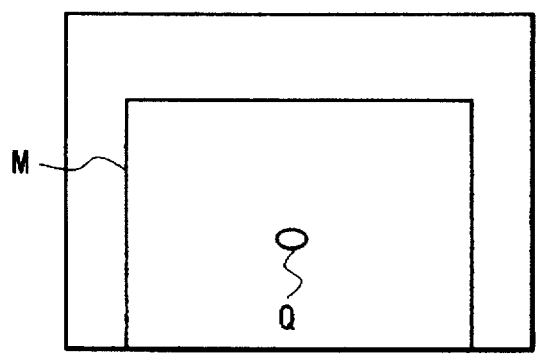

In this case. if the object distance is larger than a predetermined threshold β (step S13). the control part 54 switches on the indication M of the frame in the finder, as shown in FIG. 12D (step S14).

Figure 12E:
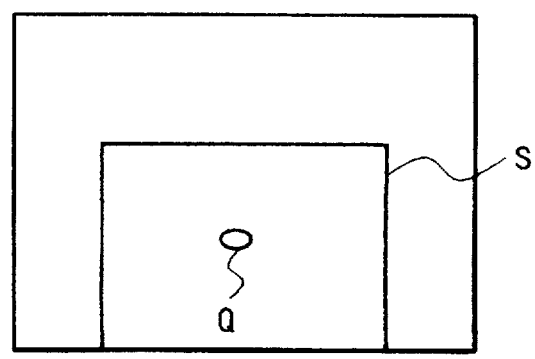

On the other hand. if the object distance is smaller than the predetermined threshold β. the control part 54 switches on the indication S of the frame in the finder, as shown in FIG. 12E (step S15).

In this state. if the release button 52 is pressed to its full-stroke position. the shifting mechanism 57 drives the photograph optical system 60 in accordance with the distance measurement value. and subsequently. film exposure is performed.

With the above-mentioned operations. the "switching between the distance measurement marks P and Q to be indicated" and "switching between the first and second light emitting parts 55 and 56 to be turned on" are performed in response to switching of the focal length by the macro changing switch 53.

Accordingly. since the two distance measurement marks corresponding to the two light emitting portions are appropriately changed in correspondence with the macro or ordinary photograph mode. the photographer can perform distance measurements on the basis of the distance measurement mark suitable for the current focal length.

In each of the above-mentioned embodiments. the optical axis O is adopted as the distance measurement axis T so as to perform distance measurements at the center of the photograph frame. However. the present invention is not limited to this. For example. the distance measurement axis T. which has the object-side principal point of the photograph optical system and is not parallel to the optical axis O. may be adopted. In such a case. the first light beam B substantially parallel to the distance measurement axis T and the second light beam C that substantially crosses the distance measurement axis T in. e.g., the macro region, are projected. With this arrangement. the parallax generated upon distance measurements on a portion other than the center of the photograph frame in. e.g.. a multi-point distance measuring device. can be eliminated.

In each of the above embodiments, since the receiving elements 17 and 18 are arranged to be offset vertically. the "reflected light of the first light beam B" that returns horizontally. and the "reflected light of the second light beam C" that returns from the obliquely lower position are independently received. This arrangement is preferable since the receiving width of each of the receiving elements 17 and 18 does not become too large, and a decrease in distance measurement precision due to marginal light can be prevented due to the limited receiving region. However. the present invention is not limited to such specific arrangement. For example. when the first and second light beams B and C are time-divisionally produced. the reflected light components of the two light beams are not received concurrently. and a single receiving element that can cover the receiving regions of these receiving elements 17 and 18 may be arranged.

Furthermore. in each of the above embodiments. the second light beam C is projected toward the macro region. However. the present invention is not limited to such specific arrangement. but the second light beam C need only be projected toward a specific region where the parallax associated with the distance measuring portion is to be eliminated. For example. the second light beam C may be projected toward the shortest distance side of the distance measurement range in the ordinary photograph mode. With this arrangement. the parallax associated with the distance measuring portion in the range from middle to near distances can be eliminated.

In each of the above embodiments. two light beams are projected. However. the present invention is not limited to such specific arrangement. For example. two or more light beams may be independently projected toward two or more regions. and the parallax associated with each distance measuring portion may be eliminated for each of the plurality of regions.

Furthermore. in the fifth embodiment. the distance measurement marks P and Q are selectively indicated in accordance with "switching of the photograph distance (focal length)" by the macro changing switch 53. However. the present invention is not limited to such specific arrangement. For example. both the distance measurement marks P and Q may be indicated. the distances to objects corresponding to the two marks may be measured when the release button 52 is pressed halfway. and one of the two distance measurement marks may be turned off in correspondence with the detection results.

Also. the distance measurement marks to be indicated may be switched in correspondence with the "shift amount of the photograph optical system 60" or "the object distance detection value by the control part 54".

Figure 19:
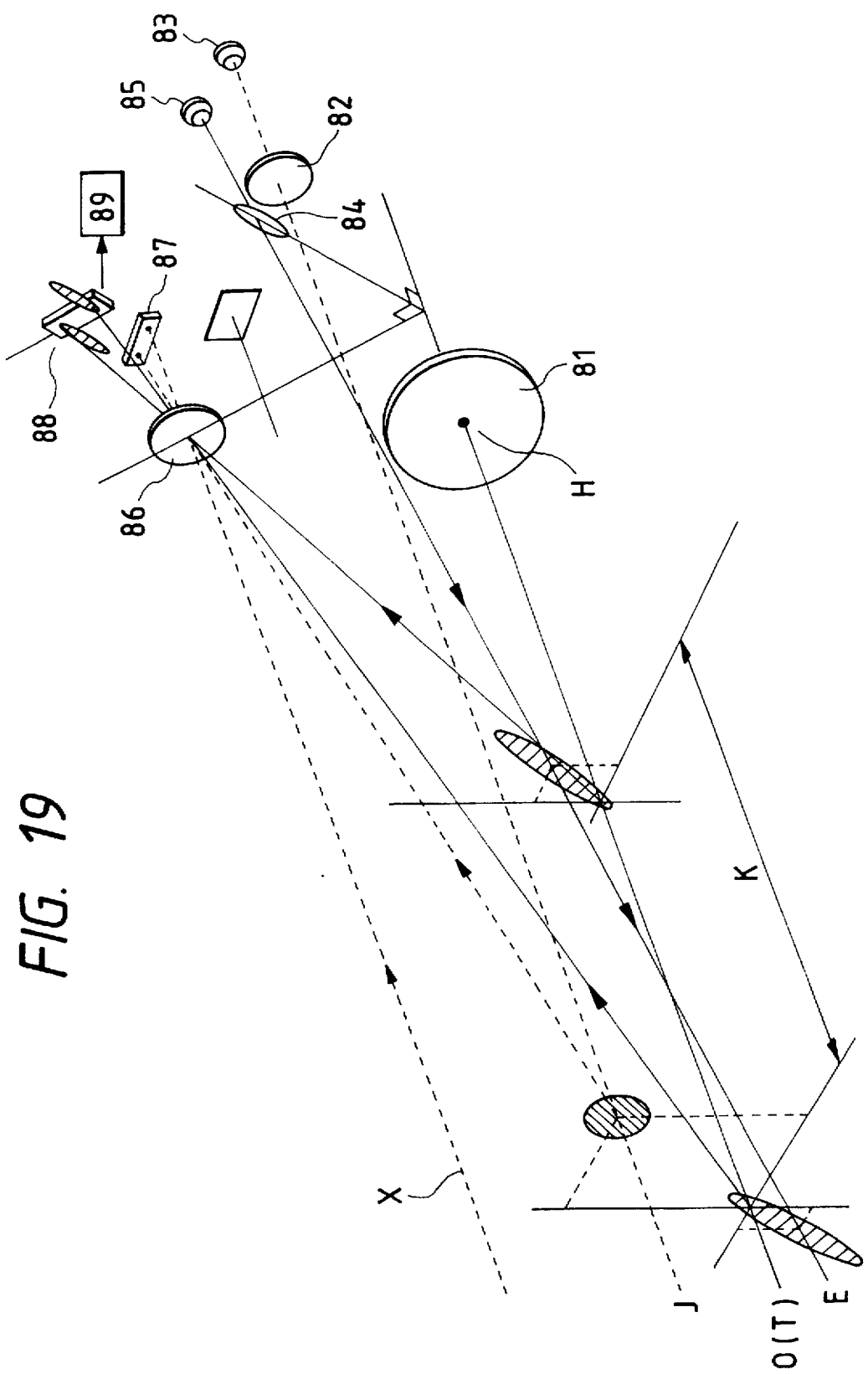
FIG. 19 is a view for explaining the sixth embodiment of the present invention.

FIG. 19 is a view showing the sixth embodiment.

Figure 20:
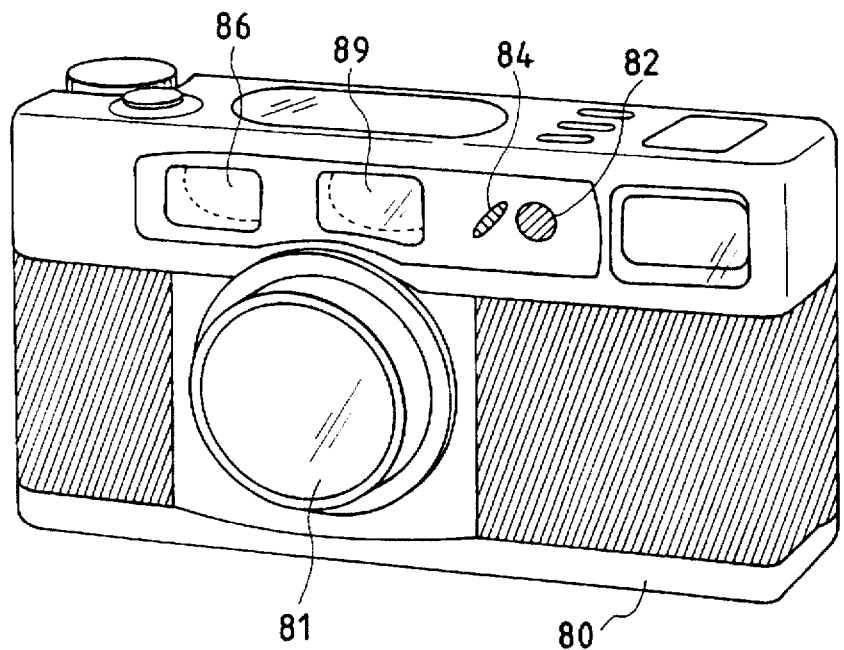
FIG. 20 is a view for explaining the outer appearance of the sixth embodiment.

FIG. 20 is a view showing the outer appearance of the sixth embodiment.

Referring to FIGS. 19 and 20, a photograph optical system 81 is attached to the front surface of a camera 80. and a projecting lens 82 is arranged at the upper right position. on the front surface. above the photograph optical system 81. A light emitting element 83 is arranged behind the projecting lens 82.

Another projecting lens 84 is arranged in the neighborhood of the projecting lens 82, and another light emitting element 85 is arranged behind the projection lens 84.

A receiving lens 86 is arranged at the upper left position, on the front surface, above the photograph optical system 81, and receiving elements 87 and 88 comprising. e.g.. PSDs (position sensor devices) and the like are vertically arranged behind the receiving lens 86. The receiving elements 17 and 18 are connected to a distance detecting part 89.

The positional relationship among these constituting elements will be described in detail below.

An axis that connects the principal point of the projecting lens 82 and the light emitting element 83 extends in a direction substantially parallel to an optical axis O of the photograph optical system 81.

On the other hand, the projecting lens 84 has a low-profile lens shape, and is set so that the prolongation of its longitudinal direction D3 crosses the optical axis O.

The radiation direction and radiation angle of a planar light beam E that exits from the projecting lens 84 are adjusted along a "plane including the exit position and the optical axis O", and illuminates the entire section on the optical axis O in the macro region (this section will be referred to as a "specific section Y on the optical axis O" hereinafter).

Furthermore, the "perpendicular dropped from the projecting lens 84 to the optical axis O" and the "perpendicular dropped from the receiving lens 86 to the optical axis O" make substantially right angles, as shown in FIG. 19.

The receiving surface of the receiving element 88 is formed to have roughly a rectangular shape, and the receiving element 88 is set so that the prolongation of its longitudinal direction crosses the optical axis O. The detection direction of the receiving position on the receiving element 88 agrees with the longitudinal direction D4 of the receiving surface, and extends in a direction substantially parallel to the direction of thickness of the planar light beam E.

Furthermore, by adjusting the relative positions of the receiving lens 86 and the receiving element 88, the entire specific section on the optical axis O falls within the receiving region.

Note that the projecting unit 73 corresponds to the projecting lens 84 and the light emitting element 85, the receiving unit 74 corresponds to the receiving lens 86 and the receiving element 88, the distance detecting circuit 75 corresponds to the distance detecting part 89, the distance measurement axis T corresponds to the optical axis O, and the specific section corresponds to the "optical axis O in the macro region".

The projecting optical system corresponds to the projecting lens 84, and the projecting unit corresponds to the light emitting element 85.

The receiving optical system corresponds to the receiving lens 86, and the receiving element corresponds to the receiving element 88.

The second projecting unit corresponds to the projecting lens 82 and the light emitting element 83.

The distance measuring operation of the sixth embodiment will be described below.

Irradiation light emitted by the light emitting element 83 is shaped into a rod-like light beam J via the projecting lens 82, and is projected in a direction substantially parallel to the optical axis O. The rod-like light beam J is used in distance measurements in the ordinary photograph mode.

On the other hand, since the projecting lens 84 is roughly a rectangular or elliptic, low-profile exit pupil (in this case, the lens shape), a light beam passing through the projecting lens 84 is shaped into the planar light beam E. The planar light beam E crosses the specific section on the optical axis O, as shown in FIG. 21.

The receiving region defined by the receiving lens 86 and the receiving element 88 becomes a planar region R. This planar region R includes the entire specific section on the optical axis O.

Figure 21:
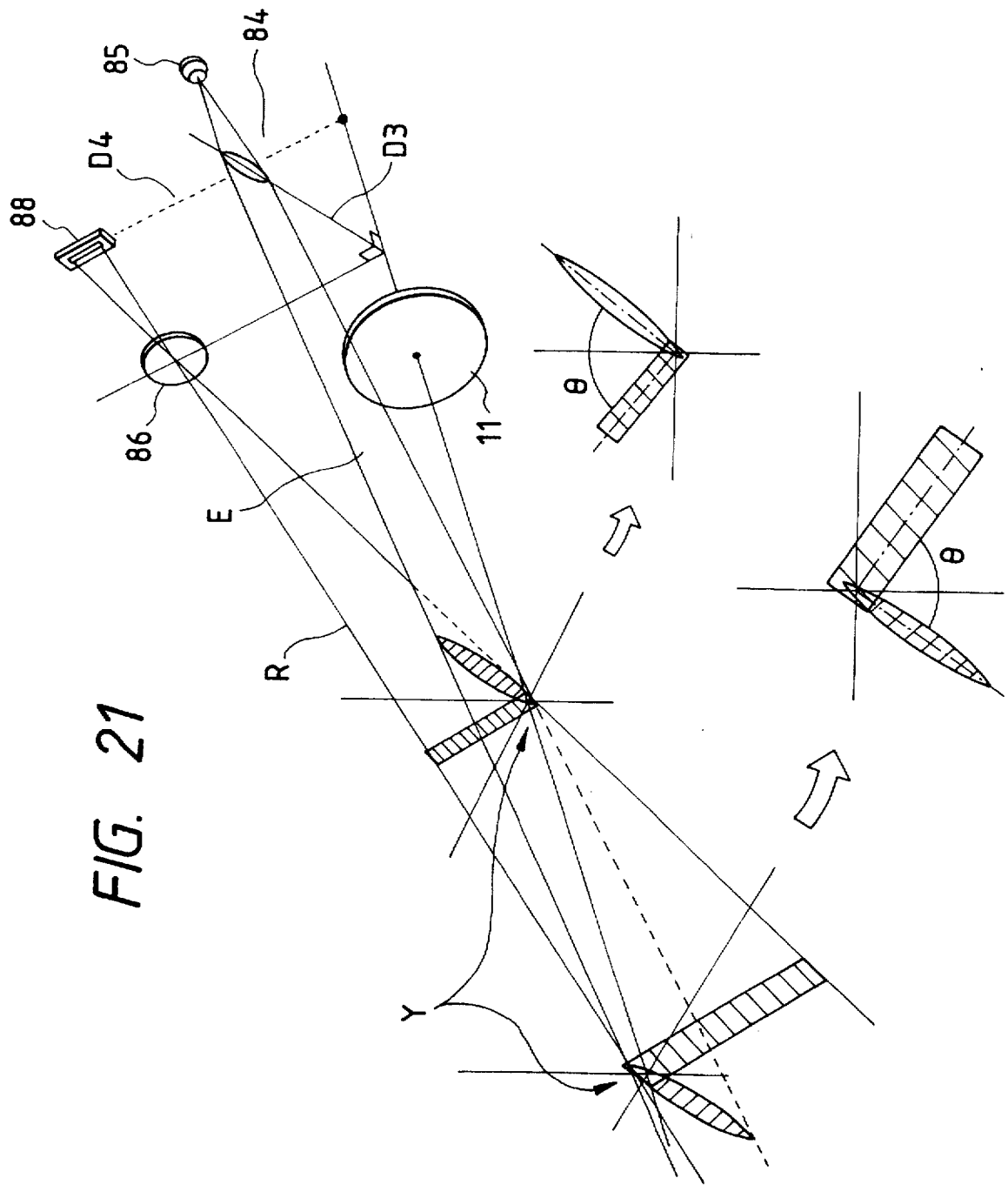
FIG. 21 is a view for explaining the optical path arrangement in the sixth embodiment.

The planar light beam E and the planar region R substantially perpendicularly cross each other in the specific section on the optical axis O, as shown in FIG. 21 (ideally, the light beam E and the planar region R preferably form right angles, but a crossing angle $\theta$ they make may fall within the range from 60° to 120°, in practice).

With this optical path arrangement, only reflected light generated in the crossing region between the planar light beam E and the planar region R is received by the receiving element 88.

For this reason, only when an object is located in this crossing region, a light point is projected onto the receiving surface of the receiving element 88. The receiving element 88 detects the receiving position of this light point.

In this manner, a straight line that connects the "receiving position detected by the receiving element 88" and the "image-side principal point of the receiving lens 86" is assumed, and an angle $\gamma$ the straight line and the optical axis O make is calculated.

Subsequently, by dividing the "distance between the object-side principal point of the receiving lens 86 and the optical axis O" by the tangent value of the angle $\gamma$, the distance to the object is calculated (in practice, the object distance is calculated on the basis of a conversion formula or table that expresses the correspondence between the receiving position and the object distance).

With the above-mentioned operations, in the sixth embodiment, since the section in the vicinity of the optical axis O is subjected to distance measurements, the distance to an object at the center of the photograph frame is measured. Therefore, the parallax associated with the distance measuring portion can be completely removed.

Since pin-point distance measurements are performed for only the cross section in the vicinity of the optical axis O, the distance to the small object to be measured can be precisely measured.

In addition, since "reflected light of the planar light beam E" generated outside the crossing region is not received by the receiving element 88 at all, noise light components reflected by objects other than the object to be measured can be dramatically reduced, and the distance measurement precision can be greatly improved.

Since the receiving element 88 detects the receiving position in the direction substantially parallel to the direction of thickness of the planar light beam E, the illuminance distribution in the detection direction on the receiving surface can be narrowed. Accordingly, measurement errors of the receiving position can be eliminated, and the distance measurement precision can be improved.

Furthermore, when the crossing angle $\theta$ between the planar light beam E and the planar region R is set to be nearly a right angle, the size of the crossing region can be minimized. In this manner, by minimizing the size of the crossing region, the distance to a small point can be precisely measured.

Also, by minimizing the size of the crossing region, noise components generated by objects other than the object to be measured can be further reduced, and the distance measurement precision can be further improved.

Moreover, when the second projecting unit (the projecting lens 82 and the light emitting element 83) is added, the distance measurement range in the ordinary photograph mode can be covered.

In the sixth embodiment, the planar light beam E is formed by using the projecting lens 84 having a low-profile lens shape. However, the present invention is not limited to such specific arrangement. For example, the planar light beam E may be formed by arrangements shown in FIGS. 22B to 22D, and FIG. 23.

Figure 22A:
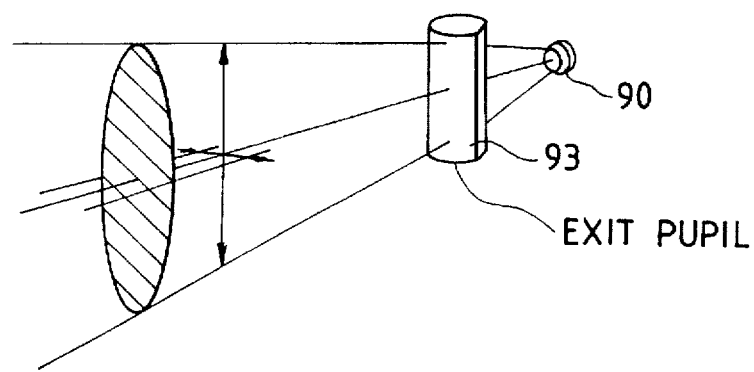
FIGS. 22A, 22B, 22C and 22D are views showing examples of the arrangement of projecting means.
Figure 22B:
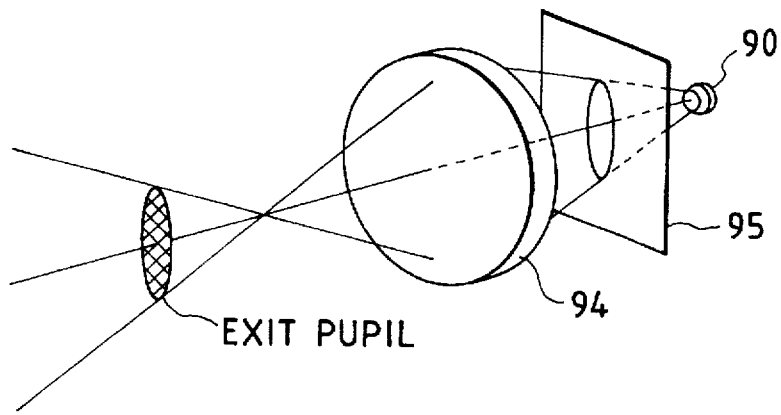

More specifically, in FIG. 22B, an aperture mask 95 formed with a low-profile aperture is inserted between a lens 94 and a light emitting element 90. In this arrangement, nearly a rectangular or elliptic exit pupil is formed at the position of the "projected image of the aperture mask 95 by the lens 94". The planar light beam E is projected from this exit pupil.

Figure 22C:
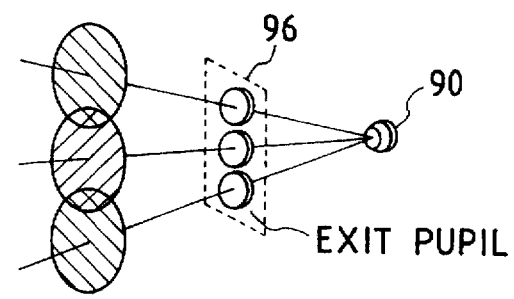

In FIG. 22C, a compound lens 96 defined by nearly a rectangular or elliptic array of single lenses is arranged in front of the light emitting element 90. With this arrangement, the array of single lenses forms nearly a rectangular or elliptic exit pupil. The planar light beam E is projected from this exit pupil.

Figure 22D:
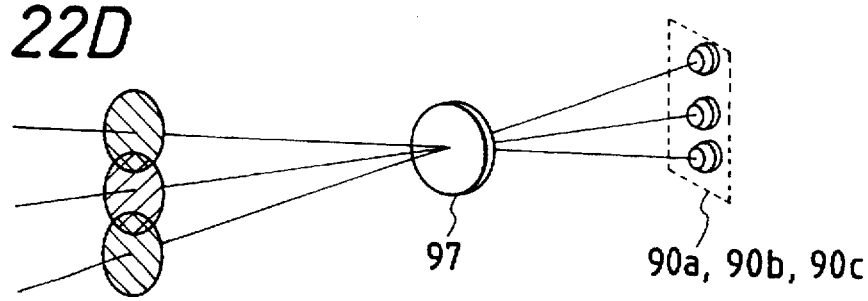

Furthermore, in FIG. 22D, light emitting elements 90a to 90c are arranged in nearly a rectangular or elliptic pattern, and a lens 97 is arranged in front of these elements. In this arrangement, light beams are projected in directions connecting the individual light emitting elements and the principal point of the lens 97, thus forming the planar light beam E.

Figure 23:
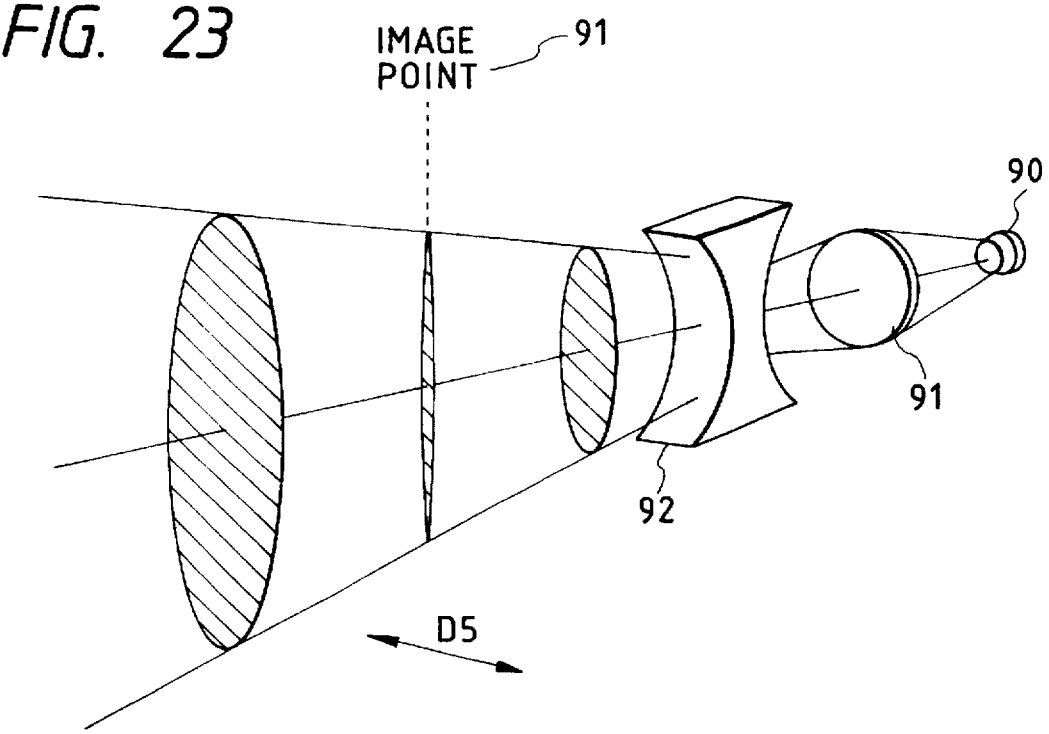
FIG. 23 is a view showing an example of the arrangement of another projecting means.

Also, in FIG. 23, the light emitting element 90, a positive lens 91, and a biconcave negative lens 92 are arranged in line. In this arrangement, since the light beam section is expanded in the divergent direction of the biconcave negative lens 92, the planar light beam E is formed. At this time, the planar light beam E converges in its direction D5 of thickness by the convergence effect of the positive lens 91.

In the sixth embodiment, the projecting lens 84 and the receiving lens 86 are horizontally arranged. However, the present invention is not limited to such specific arrangement. For example, these lenses may be arranged, as shown in FIGS. 24A to 24C.

Figure 24A:
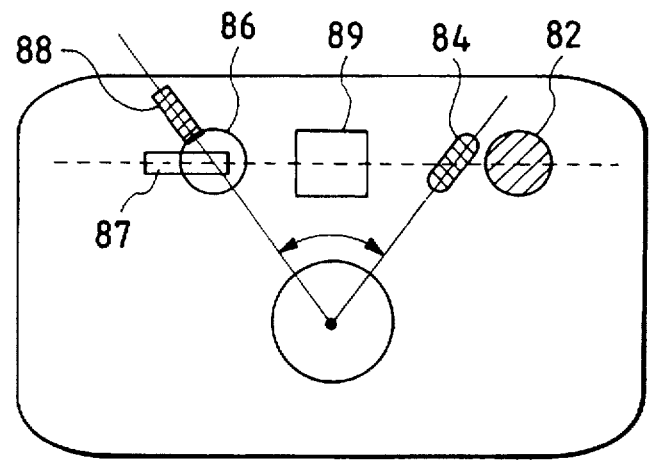
FIGS. 24A, 24B and 24C are views showing examples of the layout of a projecting lens.

More specifically, in FIG. 24A, the two lenses are arranged, so that the "perpendicular dropped from the projecting lens 84 to the optical axis O" and the "perpendicular dropped from the receiving lens 86 and the receiving element 88 to the optical axis O" do not form right angles when viewed from the front surface of the camera. With this arrangement, the crossing region between the planar light beam E and the planar region R is vertically or horizontally elongated. By changing the shape of the crossing region, the distance measurement region on the photograph frame can be desirably changed.

Figure 24B:
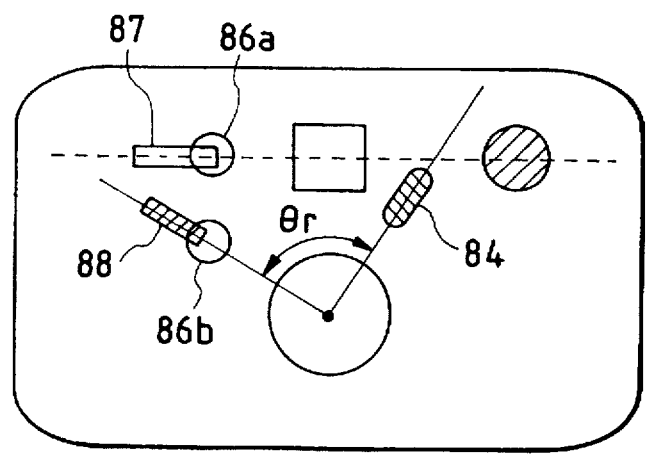

In FIG. 24B, a receiving lens 86b is arranged exclusively for the receiving element 88. With this arrangement, the degree of freedom in designing the optical path can be increased.

Figure 24C:
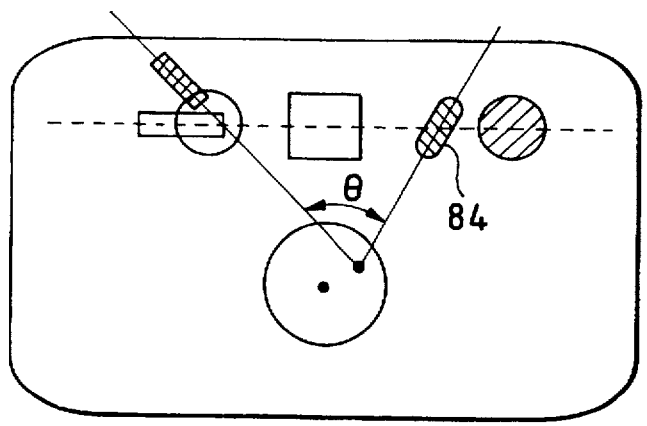

Furthermore, in FIG. 24C, the crossing region is set on the distance measurement axis other than the optical axis. With this arrangement, the distance to an object in a region other than the center of the photograph frame can be measured.

Still another embodiment will be described below.

Figure 25:
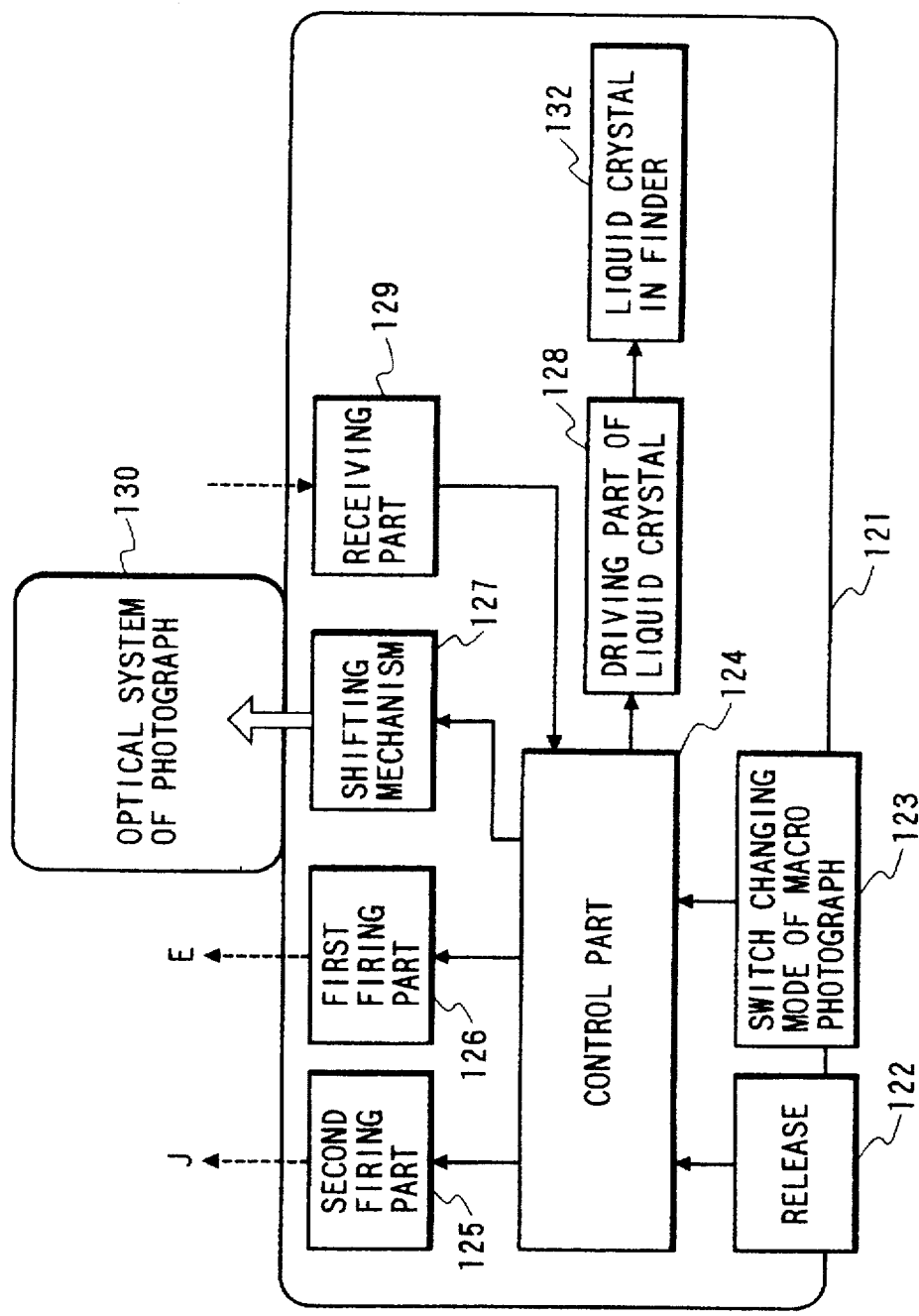
FIG. 25 is a view showing the seventh embodiment of the present invention.

FIG. 25 is a view showing the seventh embodiment.

Referring to FIG. 25, a release button 122 and a macro changing switch 123 are arranged on the housing of a camera main body 121, and the output terminals of these switches are connected to a control part 124.

The output terminals of the control part, 124 are independently connected to a second light emitting part 125, a first light emitting part 126, a shifting mechanism 127, and a liquid crystal driving part 128, and the input terminal of the control part 124 is connected to a receiving part 129.

The projecting direction of a rod-like light beam J by the second light emitting part 125 is parallel to the optical axis O of a photograph optical system 130, and the projecting direction of a planar light beam E by the first light emitting part 126 crosses the optical axis O in the macro region of the photograph optical system 130.

The driving force for the shifting mechanism 127 is transmitted to the photograph optical system 130 via a lens mount part, and the output terminal of the liquid crystal driving part 128 is connected to a liquid crystal 132 in a finder.

Figure 26A:
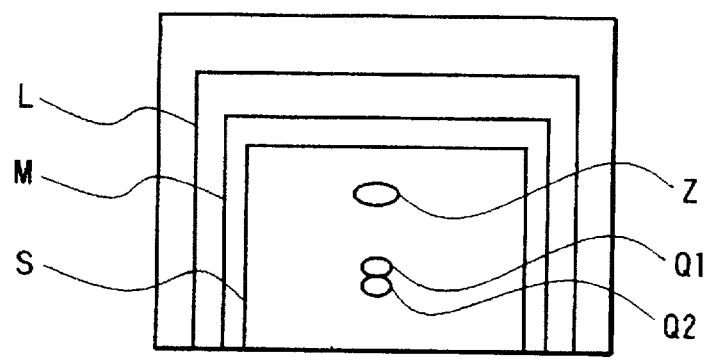
FIGS. 26A, 26B, 26C, 26D and 26E are views showing indications in a finder in the seventh embodiment.

The liquid crystal 132 in the finder is formed in advance with indication patterns shown in FIG. 26A. Note that a distance measurement mark Z is indicated at a position where the vanishing point of the optical axis O is seen through from the finder. A distance measurement mark Q1 is indicated at a position where the "far-side position of the optical axis O within the macro region or the far-side predetermined position" is seen through from the finder. A distance measurement mark Q2 is indicated at a position where the "near-side position of the optical axis O within the macro region or the near-side predetermined position" is seen through from the finder.

Note that the projecting unit 73 corresponds to the first light emitting part 126, the receiving unit 74 corresponds to the receiving part 129, and the distance detecting circuit 75 corresponds to the control part 124.

Also, the distance measurement marks correspond to the distance measurement marks Q1 and Q2 indicated on the liquid crystal 132 in the finder.

Furthermore, the second projecting unit corresponds to the second light emitting part 125.

FIG. 27 is a flow chart for explaining the operation of the seventh embodiment.

The operation of the seventh embodiment will be described below with reference to these drawings.

The control part 124 reads the switch condition of the macro changing switch 123 to check if the current mode is the "macro photograph mode" or "ordinary photograph mode" (step S1).

If the current mode is the ordinary photograph mode, the control part 124 indicates the distance measurement mark Z in the finder, and quits indication of the distance measurement marks Q1 and Q2 (step S2).

If the release button 122 is pressed halfway in this state (step S3), the control part 124 turns on the second light emitting part 125, and turns off the first light emitting part 126 (step S4).

The receiving part 129 receives the reflected light of a light beam projected from the second light emitting part 125. The control part 124 detects the position, on the receiving element, of the reflected light, and calculates the distance to the object (step S5).

Figure 26B:
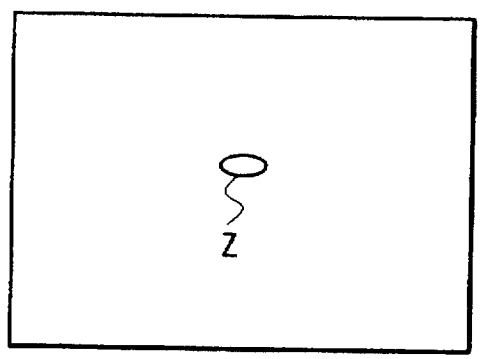

If the object distance is larger than a predetermined threshold α (step S6), the control part 124 switches off indications L, M, and S of frames, as shown in FIG. 26B (step S7).

Figure 26C:
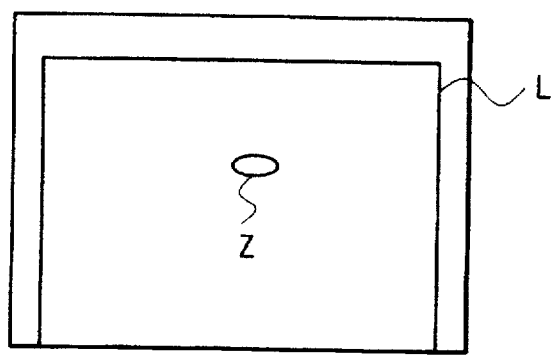

On the other hand, if the object distance is smaller than the predetermined threshold α, the control part 124 switches on the indication L of frame in the finder, as shown in FIG. 26C (step S8).

If the release button 122 is pressed to its full-stroke position in this state, the shifting mechanism 127 drives the photograph optical system 130 in accordance with the distance measurement value, and subsequently, film exposure is performed.

On the other hand, if the current mode is the macro photograph mode (step S1), the control part 124 indicates the distance measurement mark Q1 in the finder, and quits indication of the distance measurement mark Z (step S9).

If the release button 122 is pressed halfway in this state (step S10), the control part 124 turns on the first light emitting part 126, and turns off the second light emitting part 125 (step S11).

Subsequently, the receiving part 129 receives the reflected light of a light beam projected from the first light emitting part 126. The control part 124 detects the position, on the receiving element, of the reflected light, and calculates the distance to the object (step S12).

Figure 26D:
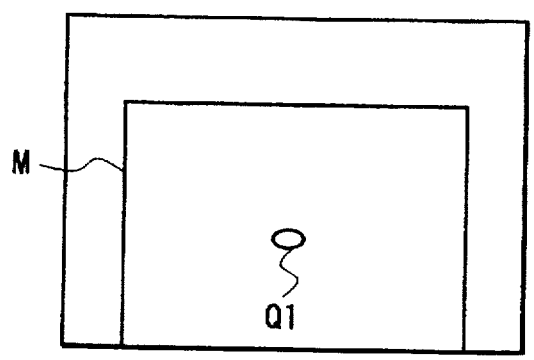

In this case, if the object distance is larger than a predetermined threshold β (step S13), the control part 124 switches on the indication M of the frame in the finder, as shown in FIG. 26D (step S14).

Figure 26E:
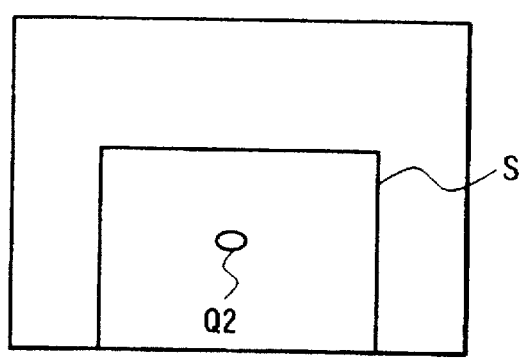
Figure 28A:
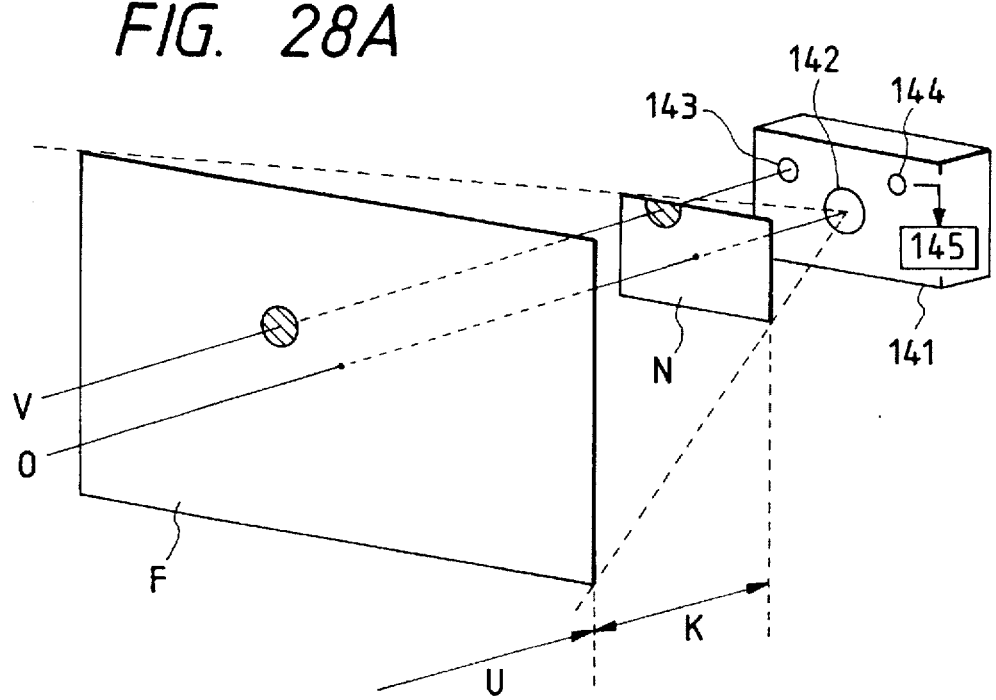
FIGS. 28A, 28B and 28C are views for explaining a conventional distance measuring device.
Figure 28B:
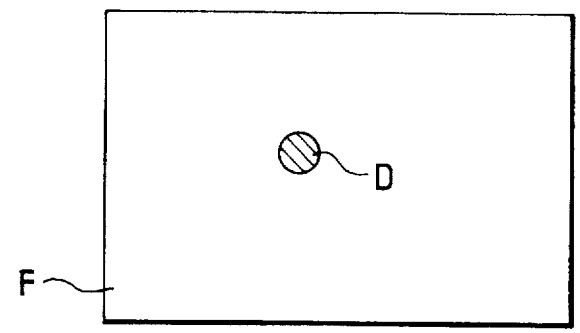
Figure 28C:
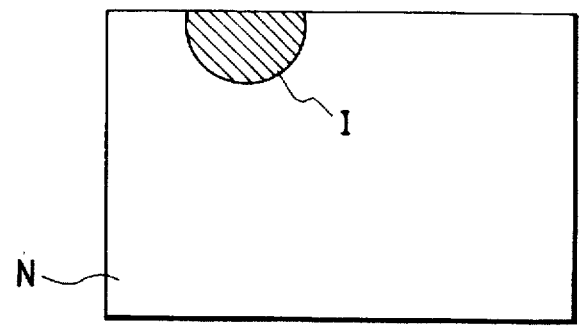
Figure 29A:
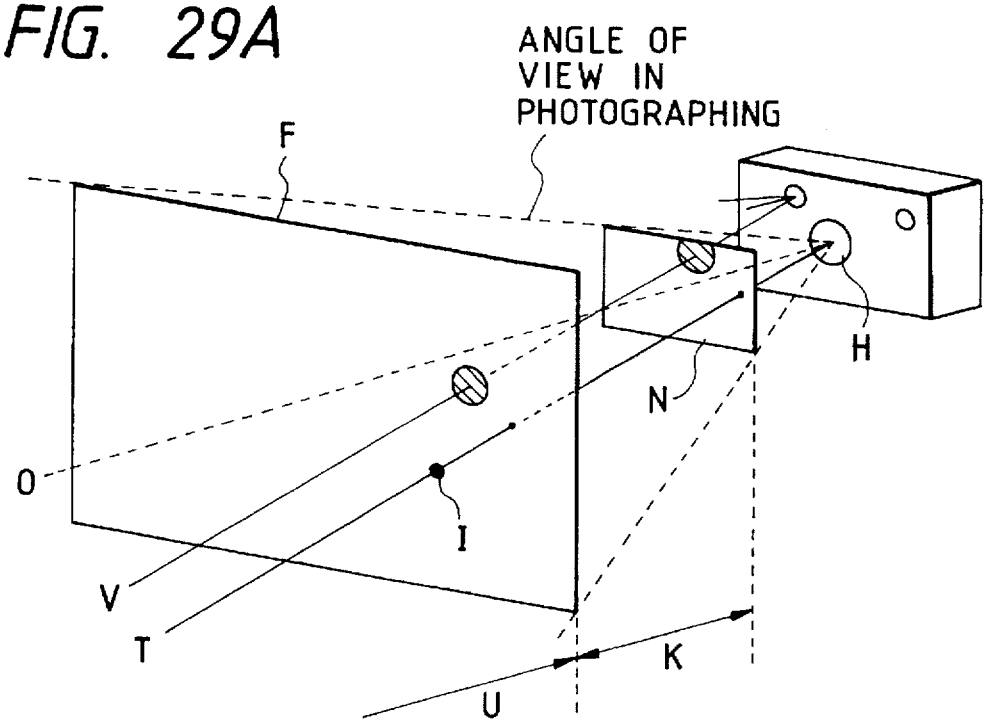
FIGS. 29A, 29B and 29C are views for explaining a multi-point distance measuring device of earlier technology.
Figure 29B:
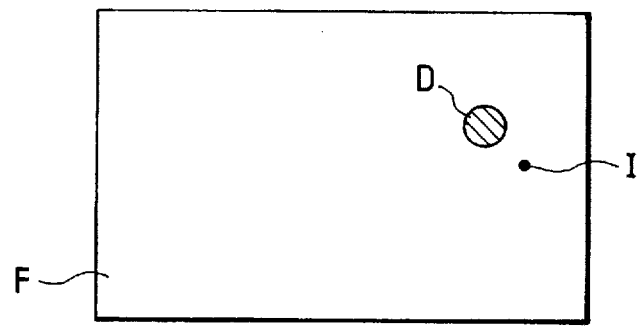
Figure 29C:
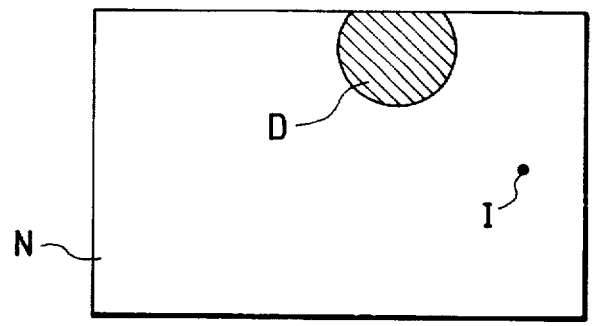

On the other hand, if the object distance is smaller than the predetermined threshold β, the control part 124 switches on the indication S of the frame in the finder, as shown in FIG. 26E (step S15), and changes the distance measurement mark to be indicated from Q1 to Q2 (step S16).

In this state, if the release button 122 is pressed to its full-stroke position, the shifting mechanism 127 drives the photograph optical system 130 in accordance with the distance measurement value, and subsequently, film exposure is performed.

With the above-mentioned operations, since the three distance measurement marks are appropriately selectively indicated, the photographer can perform distance measurements on the basis of the appropriately selected distance measurement mark.

In each of the above-mentioned embodiments, the optical axis O is adopted as the distance measurement axis T so as to perform distance measurements at the center of the photograph frame. However, the present invention is not limited to this. Generally, an axis, which has the object-side principal point H, of the photograph optical system as the start point, may be adopted as the distance measurement axis T. With this arrangement, the distance to a portion other than the center of the photograph frame can be measured.

Furthermore, in each of the above embodiments, the planar light beam E is projected toward the macro region. However, the present invention is not limited to this specific arrangement, but the planar light beam E need only be projected toward a specific region from which the parallax associated with the distance measuring portion is to be eliminated. For example, the planar light beam E may be projected toward the shortest distance side of the distance measurement range in the ordinary photograph mode. With this arrangement, the parallax associated with the distance measuring portion in the range from middle to near distances can be eliminated.

In the seventh embodiment, the distance measurement mark to be indicated is switched after distance measurements, but the present invention is not limited to this.

For example, in the macro photograph mode, both the distance measurement marks Q1 and Q2 may be indicated. With such indications, the photographer can adequately estimate the distance measurement position corresponding to the macro photograph distance by appropriately selecting the distance measurement marks Q1 and Q2 or appropriately interpolating between the distance measurement marks Q1 and Q2.

Furthermore, when the mode upon pressing the release button halfway previously was the macro photograph mode (and if this record is not erased by turning off the main power supply), one of the distance measurement marks Q1 and Q2 is preferably selected and indicated in correspondence with the previous distance measurement result. With this indication, the distance measurement mark Q1 or Q2 can be quickly indicated.

As described above, since the second light beam crosses the distance measurement axis in the predetermined object distance range, the parallax associated with the distance measuring portion can be greatly eliminated in the vicinity of the crossing point.

On the other hand, since the first light beam is projected in the direction substantially parallel to the distance measurement axis as in the conventional device, the parallax associated with the distance measuring portion can become small over the range from the middle to far distances.

Hence, when the second light beam is projected to the range that suffers the large parallax associated with the distance measuring portion caused by the first light beam (e.g., toward the macro region or the shortest distance side of the distance measurement range), the parallax associated with the distance measuring portion can be eliminated.

Therefore, measurements of the distance to a position largely offset from the distance measuring portion set on the photograph frame can be avoided.

As a consequence, since the photographer of the camera can measure the distance to an object while fixing the object at the distance measuring portion on the photograph frame, he or she need not independently perform "distance measurements of an object" and "angle setting of the photograph frame", and the photographing efficiency can be greatly improved.

In the present invention, since the light beam section of the second light beam is set to be smaller than that of the first light beam within the predetermined object distance range, the first and second light beams can be balanced in association with the ratio of the "sectional areas of exit light beams" on the photograph frame.

In particular, the field depth of the photograph optical system is very small in the macro photograph mode. In such situation, since the light beam section of the second light beam is decreased, the distance to a small point can be precisely measured, and the focus of the camera can be accurately brought to a desired point.

Even when a small object is to be photographed, the second light beam rarely spreads outside the object, and light components reflected by objects other than the object to be photographed can be reduced, thus greatly improving the distance measurement precision.

In the present invention, since the exit pupil of the second light beam is set to be smaller than that of the first light beam, the first and second light beams can be balanced in association with the ratio of the "cross sectional areas of exit light beams" on the photograph frame.

In particular, the field depth of the photograph optical system is very small in the macro photograph mode. In such situation, since the exit pupil of the second light beam is decreased, the distance to a small point can be precisely measured, and the focus of the camera can be accurately brought to a desired point.

Even when a small object is to be photographed, the second light beam rarely spreads outside the object, and light components reflected by objects other than the object to be photographed can be reduced, thus greatly improving the distance measurement precision.

In the present invention, since the second light beam is brought to convergence within the predetermined object distance range, the light beam cross section of the second light beam can be decreased in the vicinity of the convergence point.

In particular, the field depth of the photograph optical system is very small in the macro photograph mode. In such situation, since the light beam section of the second light beam is decreased, the distance to a small point can be precisely measured, and the focus of the camera can be accurately brought to a desired point.

Even when a small object is to be photographed, the second light beam rarely spreads outside the object, and light components reflected by objects other than the object to be photographed can be reduced, thus greatly improving the distance measurement precision.

In the present invention, the exit position of the second light beam is set closer to the distance measurement axis.

Normally, since the second light beam crosses the distance measurement axis, the range with small parallax associated with the distance measuring portion is limited to a small one as compared to the first light beam side. However, when the exit position of the second light beam is set closer to the distance measurement axis of the photograph optical system than that of the first light beam, the angle formed by the distance measurement axis with the second light beam become smaller, and the range with small parallax of the second light beam side can be broadened. With this arrangement, the first and second light beams can be balanced in association with the widths of the ranges with small parallax.

In the present invention, since the first and second projecting units 1 and 2 commonly use a light source or lens, the arrangement of the distance measuring device can be simplified.

Accordingly, the number of parts and cost can be reduced while assuring easy assembly of the distance measuring device.

In the present invention, the aperture mask is arranged in front of one irradiation unit.

Normally, when the first and second projecting units 1 and 2 commonly use a single lens, a method of setting different lens diameters cannot be adopted to decrease the light beam cross section of one beam.

However, when the aperture stop is arranged in front of the irradiation unit of the second light beam side, the exit pupil of the second light beam can be decreased by a simple structure.

In the present invention, the "optical path of the first light beam" outside the predetermined object distance range is seen through from the finder, and the "first distance measurement mark" is indicated at the see-through portion.

Also, the "optical path of the second light beam" within the predetermined object distance range is seen through from the finder, and the "second distance measurement mark" is indicated at the see-through portion.

In this way, since different distance measurement marks are indicated on the finder in correspondence with the first and second light beams, the photographer can appropriately select the distance measurement marks in consideration of the approximate distance to the object.

As compared to a case wherein such marks are indicated as a single distance measurement mark, the position of each distance measurement mark can be accurately indicated, and the distance measurement precision of the photographer can be greatly improved.

In the present invention, the distance measurement mark to be indicated is automatically changed.

In general, the object that the photographer wants to photograph is most frequently located in the vicinity of the focal plane or in the moving direction of the focal plane irrespective of the automatic or manual focusing mode.

Hence, when the "first distance measurement mark" and "second distance measurement mark" to be indicated are changed in accordance with the "shift amount" or "focal length" related to the focal plane of the photograph optical system, a distance measurement mark matching the object to be photographed can be indicated.

Also, the object that the photographer wants to photograph is likely to be located in the vicinity of the object distance detected by the distance detecting circuit 4.

Hence, when the "first distance measurement mark" and "second distance measurement mark" to be indicated are changed in accordance with the "detection value of the object distance", a distance measurement mark matching the object to be photographed can be indicated.

In this way, when the distance measurement mark to be indicated is changed in accordance with one of the "focal length of the photograph optical system", "shift amount of the photograph optical system", or "detection value of the object distance", a distance measurement mark matching the object to be photographed can be automatically selected and indicated.

Therefore, the photographer need not manually select one of a plurality of distance measurement marks to be indicated, and can be prevented from selecting a wrong distance measurement mark, thus improving both the photographing efficiency and reliability.

In the present invention, the first and second light beams to be produced are changed in accordance with the shift amount or focal length of the photograph optical system.

Normally, the object that the photographer wants to photograph is likely to be located in the vicinity of the focal plane or in the moving direction of the focal plane irrespective of the automatic or manual focusing mode.

Hence, when the light beam to be produced is changed in accordance with the "shift amount" or "focal length" related to the focal plane of the photograph optical system, a light beam matching the object to be photographed can be irradiated.

In this way, when the first and second light beams are automatically selected, reflected light due to an unwanted light beam can be eliminated while reducing the power consumption amount, and the distance measurement precision can be further improved.

When the light beam to be produced is changed, reflected light components of the two light beams are not received concurrently (unless the propagation delay of the first light beam is considerably different from that of the second light beam), and hence, a single receiving element may replace the two receiving elements. Accordingly, the arrangement of the receiving unit can be simplified, thus attaining a low-cost, compact distance measuring device.

In the present invention, since two sets of projecting units and receiving units are arranged to perform distance measurements in the first and second distance ranges, the parallax associated with the distance measuring portion can be independently eliminated in each distance range.

Therefore, measurements of the distance to a position largely offset from the distance measuring portion set on the photograph frame can be avoided.

As a consequence, since the photographer of the camera can measure the distance to an object while fixing the object at the distance measuring portion on the photograph frame, he or she need not independently perform "distance measurements of an object" and "angle setting of the photograph frame", and the photographing efficiency can be greatly improved. In the present invention, since the planar light beam is projected toward the set distance measuring portion, an object located in the vicinity of the distance measuring portion can be directly illuminated.

Therefore, the offset between the set and actual distance measuring portions is very small, and any parallax in the vicinity of the distance measuring portion can be preponderantly eliminated.

Since the light beam shape of the planar light beam has a spread in the longitudinal direction of the light beam cross section, the planar light beam can illuminate a broad range before and after the distance measuring portion as the crossing point as compared to a rod-like light beam with a decreased light beam size. Therefore, the distance measurement range that can maintain small parallax can be broadened.

Furthermore, since the spread of the light beam shape of the planar light beam is limited in the direction of thickness of the light beam section, the number of light components spreading outside the object to be measured can be decreased, and hence, noise light components returning from objects other than the object to be measured can be reduced. Accordingly, the distance measurement precision of the distance measuring device can be improved.

As described above, the light beam shape of the planar light beam is suitable for attaining both a "distance measurement range with small parallax" and "distance measurement precision", i.e., has merits that cannot be provided by a rod-like light beam of earlier technology.

In the present invention, the planar light beam is projected in a direction to cross the entire specific section set on the distance measurement axis In this way, as for an object located within the specific section, the positions of the "irradiation surface by the planar light beam" and the "set distance measuring portion" match on the photograph frame, and the parallax associated with the distance measuring portion can be perfectly removed.

Hence, when the photographer catches the object within the specific section on the distance measurement axis T by adjusting the direction of the camera, the distance to the object can be measured without causing any parallax.

When the entire specific section is obliquely illuminated by a rod-like light beam of earlier technology, the rod-like light beam must have a large light beam section. For this reason, the number of noise light components returning from objects other than the object to be measured inevitably increases, and the distance measurement precision lowers considerably. Furthermore, when a large radiation angle of the rod-like light beam is set to broaden the light beam section, the spread loss of the rod-like light beam inevitably increases, and the distance measurement precision further lowers.

Figure 15:
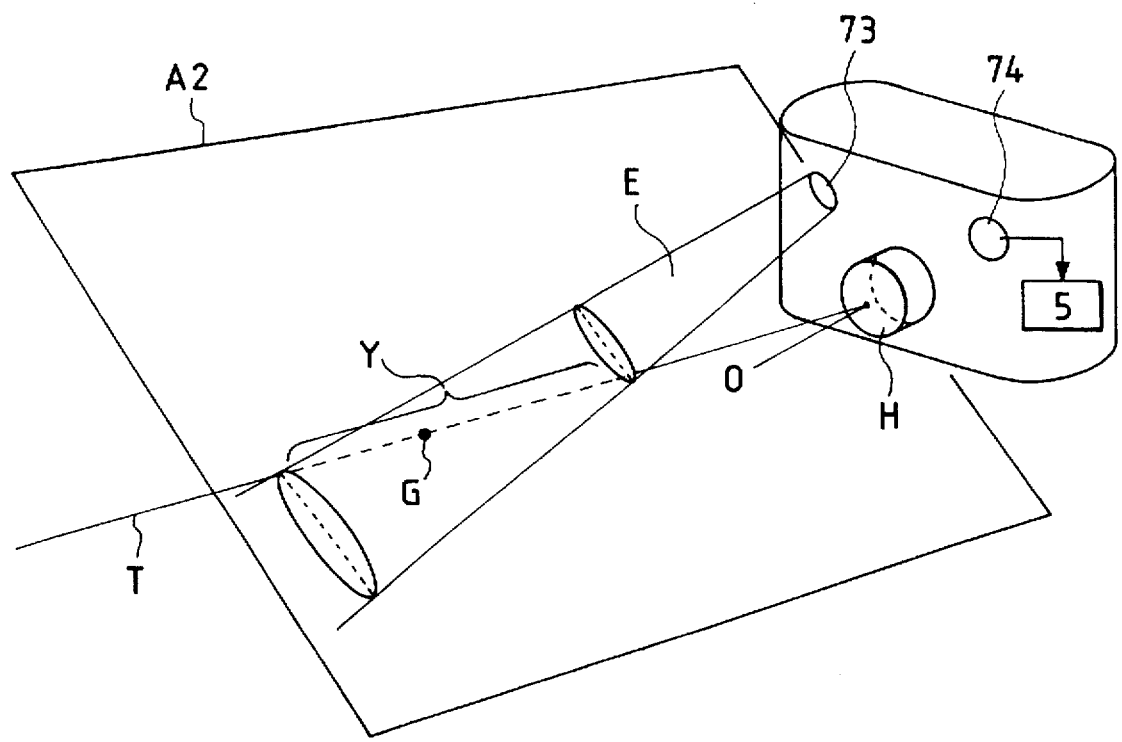
FIG. 15 is a view for explaining an embodiment of the present invention.
Figure 16:
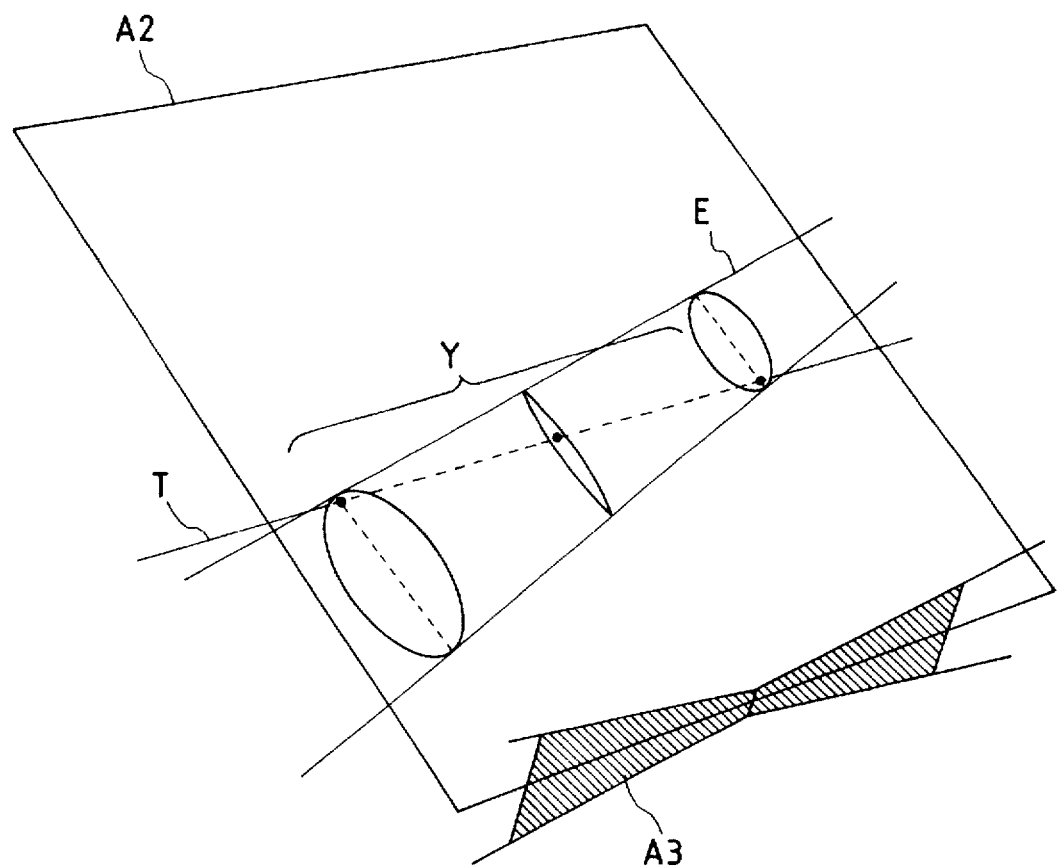
FIG. 16 is a view for explaining another embodiment of the present invention.
Figure 18:
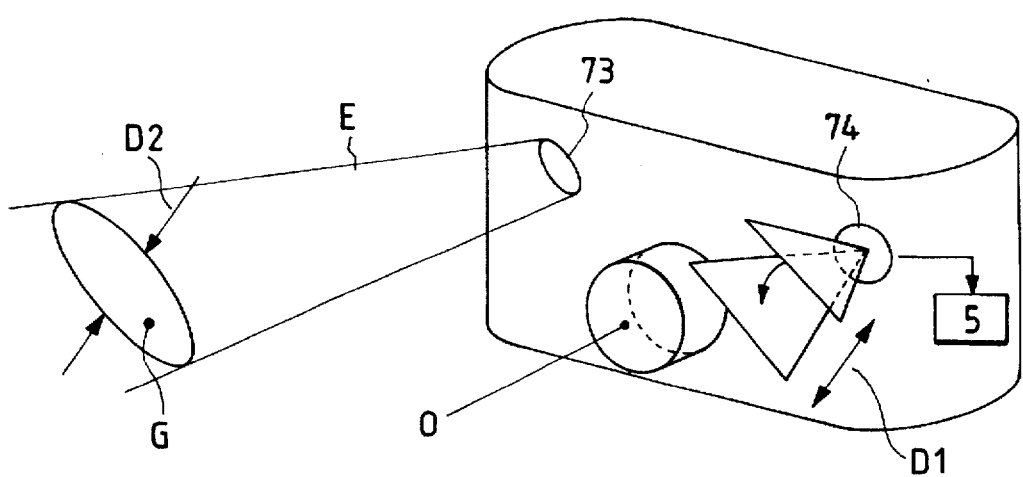
FIG. 18 is a view for explaining still another embodiment of the present invention.
Figure 17:
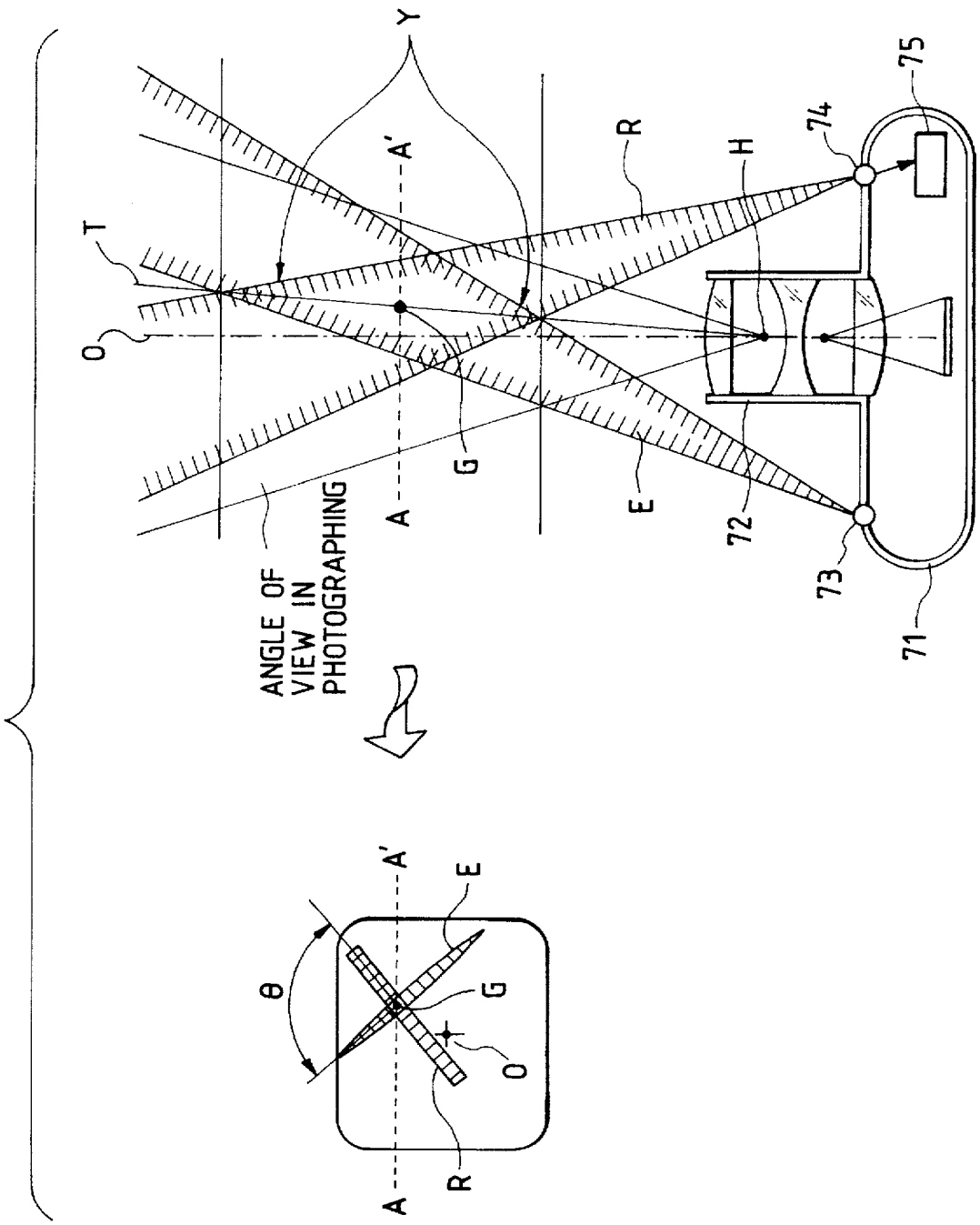
FIG. 17 is a view for explaining still another embodiment of the present invention.

However, since the distance measuring device according to one embodiment of the present invention uses the planar light beam, the spread of the light beam cross section can be suppressed as much as possible, as shown in FIG. 15, and the entire specific section can be efficiently illuminated.

Consequently, the number of light components spreading outside the object is decreased, and noise light returning from objects other than the object to be measured can be reduced. Since the light beam cross section has a small radiation angle (solid angle), the spread loss of the light beam can be minimized, and the amount of light received by the receiving unit can be increased.

For these reasons, the distance measuring device of the present invention can perfectly remove the "parallax associated with the distance measuring portion" and can improve the distance measurement precision.

In the present invention, since the projecting optical system having nearly a rectangular or elliptic exit pupil is arranged, shaping of the planar light beam can be attained by a simple structure.

Since the longitudinal direction of the exit pupil is set to agree with the direction crossing the distance measurement axis, the planar light beam can cross the distance measurement axis over a range before and after the distance measuring portion.

Furthermore, when the radiation direction and radiation angle, on the plane, of such planar light beam are appropriately adjusted, the position and width of the specific section can be easily and desirably set.

In the present invention, since nearly a rectangular or elliptic light emitting surface is arranged, projection of the planar light beam can be attained by a simple structure.

Since the longitudinal direction of the light emitting surface is set to agree with the direction crossing the distance measurement axis, the planar light beam can cross the distance measurement axis over a range before and after the distance measuring portion.

Furthermore, when the radiation direction and radiation angle, on the plane, of such planar light beam are appropriately adjusted, the position and width of the specific section can be easily and desirably set.

In the present invention, since the planar light beam is brought to convergence in its direction of thickness in the specific section, the light beam section can be decreased in the vicinity of the convergence point. For this reason, noise light returning from objects other than the object to be measured can be reduced, and the distance measurement precision can be improved.

Also, since the planar light beam is focused in its direction of thickness and the irradiation light amount increases in the vicinity of the convergence point, the distance measurement precision can be further improved.

In the present invention, since the distance measurement mark is displayed at a position where the specific section is seen through from the finder, the object can be adequately set on the specific section, and the distance to the object can be detected without any parallax.

In the present invention, since the planar region crossing the planar light beam serves as a receiving region, only reflected light components generated in this crossing region of those generated by the planar light beam are received by the receiving unit. Therefore, substantially pin-point distance measurements can be attained while limiting the distance range to the crossing region (in the vicinity of the specific section).

In this way, when pin-point distance measurements can be realized, the distance to a small object to be measured can be precisely measured. Therefore, the focus of the camera can be brought to roughly a desired point.

Since "reflected light of the planar light beam" generated outside the crossing region is not received by the receiving unit at all, reflected light components generated by objects other than the object to be measured can be dramatically reduced, and the distance measurement precision can be improved greatly.

In the present invention, since reflected light passing a receiving optical system is received by nearly a rectangular or elliptic receiving surface, the above-mentioned planar region can be formed by a simple structure.

Since the longitudinal direction of the receiving surface is set to agree with the direction crossing the distance measurement axis, the planar region can be formed along a "plane including the receiving position and the distance measurement axis", and the specific section on the distance measurement axis can be included within the receiving region.

Furthermore, when the receiving angle and receiving direction, on the plane, of the planar region are appropriately set, the entire specific section on the distance measurement axis can be desirably included in the planar region.

In the present invention, since the receiving position is detected in the direction substantially parallel to the direction of thickness of the planar light beam, the width of the spot on the receiving surface is decreased along the detection direction. Accordingly, measurement errors of the receiving position can be eliminated, and the distance measurement precision can be improved.

In the present invention, since the crossing angle θ formed by the planar light beam with the planar region is limited to fall within the range from 60° to 120°, the angle range in which the crossing region increases abruptly can be reliably avoided.

In the present invention, since the crossing angle θ the planar light beam and the planar region make is set to be roughly a right angle, the size of the crossing region can be minimized.

In this manner, by minimizing the size of the crossing region, the distance to a small point can be precisely measured. Hence, the focus of the camera can be brought to a desired point.

Also, by minimizing the size of the crossing region, reflected light components generated by objects other than the object to be measured can be further reduced, and the distance measurement precision can be further improved.

In the present invention, since the planar light beam is flattened in the direction substantially parallel to the detection direction of the receiving angle or receiving position in the receiving unit, the width of the spot on the receiving surface can be decreased along the detection direction. Therefore, the detection precision of the receiving unit can be improved and, hence, the distance measurement precision can be improved.

In the present invention, the second projecting unit is added to project a rod-like light beam in the direction substantially parallel to the distance measurement axis.

Since the planar light beam is projected toward a set distance measuring portion P, parallax can be eliminated in the vicinity of the distance measuring portion P. For this reason, the planar light beam is suitable for distance measurements in a narrow distance range.

Since the rod-like light beam is projected in the direction substantially parallel to the distance measurement axis, the parallax concerning the distance measuring portion decreases as the distance becomes farther. For this reason, the rod-like light beam is suitable for distance measurements over a broad distance range from the middle to far distances.

In this way, when the planar light beam and rod-like light beam are projected, the planar light beam E is used in distance measurements for a specific narrow distance range (e.g., distance measurements in the macro photograph mode), and the rod-like light beam is used in distance measurements in a broad distance range (e.g., distance measurements in the ordinary photograph mode).

What is claimed is:

1. A distance measuring device comprising:
    a first projecting unit to project a first light beam in a direction substantially parallel to a distance measurement axis that connects a distance measuring portion in an angle of view of photograph of a camera, and an object-side principal point of a photograph optical system;
    a second projecting unit to project a second light beam which is finer than the first light beam, in a direction crossing said distance measurement axis within a predetermined object distance range;
    a receiving unit arranged to be separated from said first and second projecting units by a given interval to receive light reflected by an object; and
    a distance detecting circuit to detect a distance to the object on the basis of a receiving angle or receiving position of the reflected light received by said receiving unit,
    wherein a light beam cross section of said second light beam is smaller than a light beam cross section of said first light beam within said predetermined object distance range.

2. A distance measuring device according to claim 1, wherein said second projecting unit has a smaller exit pupil of the light beam than that of said first projecting unit.

3. A distance measuring device according to claim 1, wherein said second light beam projected from said second projecting unit converges within said object distance range.

4. A distance measuring device according to claim 1, wherein an exit position of the light beam of said second projecting unit is closer to said distance measurement axis than that of said first projecting unit.

5. A distance measuring device according to claim 1, wherein said first and second projecting units comprise:
    an irradiation unit to irradiate light; and
    at least two lenses arranged at positions to receive the light irradiated by said irradiation unit.

6. A distance measuring device according to claim 1, wherein said first and second projecting units comprise:
    an irradiation unit to irradiate light; and
    a splitting unit to receive the light irradiated by said irradiation unit and to split the received light into said first and second light beams.

7. A distance measuring device according to claim 1, wherein said first and second projecting units comprise:
    at least two irradiation units to irradiate light; and
    a lens to receive light beams from said irradiation units and to project the received light beams as said first and second light beams.

8. A distance measuring device according to claim 7, wherein an aperture mask is arranged in front of one of said irradiation units to limit the cross section of said second light beam.

9. A distance measuring device according to claim 1, further comprising:
    a finder, a field of view range of which includes the angle of view of photograph of said photograph optical system;
    a first distance measurement mark indicated at a position in the field of view of said finder, where an optical path of said first light beam outside said object distance range is seen through from said finder; and a second distance measurement mark indicated at a position in the field of view of said finder, where an optical path of said second light beam within said object distance range is seen through from said finder.

10. A distance measuring device according to claim 9, further comprising:

an indication changing circuit to change said first and second distance measurement marks to be indicated in accordance with a focal length or shift amount of said photograph optical system or an object distance detected by said distance detecting circuit.

11. A distance measuring device according to claim 1, further comprising:

a lighting changing circuit to change said first and second light beams to be produced in accordance with a focal length or shift amount of said photograph optical system.

12. A distance measuring device comprising:

a first projecting unit to project a first light beam used in a distance measurement in a first distance range from an object distance that can be considered as infinity to a first closest distance;

a first receiving unit to receive reflected light of said first light beam in said first distance range;

a second projecting unit to project a second light beam used in a distance measurement in a second distance range from a second closest distance closer than said first closest distance to a distance in the vicinity of the first closest distance, the second light beam being a planar light beam or finer than the first light beam;

a second receiving unit to receive reflected light of said second light beam in said second distance range; and a distance detecting circuit to detect a distance to an object on the basis of a receiving angle or receiving position of the reflected light received by said first or second receiving unit.

13. A distance measuring device comprising:

a projecting unit to project a light beam toward an object;

a receiving unit to receive reflected light returning from said object side; and a distance detecting circuit to detect a distance to said object on the basis of a receiving angle or receiving position of the reflected light received by said receiving unit, wherein said projecting unit projects a low-profile planar light beam toward a predetermined distance measuring portion in the angle of view of photograph of a camera.

14. A distance measuring device according to claim 13, wherein said planar light beam projected from said projecting unit crosses an entire predetermined specific section on a distance measurement axis that connects said distance measuring portion and an object-side principal point of a photograph optical system of said camera.

15. A distance measuring device according to claim 14, wherein said projecting unit comprises:

a projecting optical system having an exit pupil arranged or formed in nearly a rectangular or elliptic shape, a prolongation of a longitudinal direction of the exit pupil crossing said distance measurement axis; and a light emitting unit to irradiate light to said projecting optical system.

16. A distance measuring device according to claim 14, wherein said projecting unit comprises:

a light emitting unit having a light emitting surface arranged or formed in nearly a rectangular or elliptic shape, a prolongation of a longitudinal direction of the light emitting surface crossing said distance measurement axis; and a projecting optical system to project light from said light emitting surface.

17. A distance measuring device according to claim 14, wherein said planar light beam projected from said projecting unit converges in a direction of thickness thereof in said specific section.

18. A distance measuring device according to claim 14, further comprising:

a finder, a field of view range of which includes the angle of view of photograph of said photograph optical system; and a distance measurement mark indicated at a position in a field of view of said finder, where said specific section is seen through from said finder.

19. A distance measuring device according to claim 14, wherein said receiving unit is set at a position outside a plane including an exit position of said projecting unit and said distance measurement axis, and has a planar region surveying said specific section from the set position as a receiving region.

20. A distance measuring device according to claim 19, wherein said receiving unit comprises:

a receiving optical system arranged outside a plane including said projecting unit and said distance measurement axis; and a receiving element including a receiving surface arranged or formed into a rectangular shape at a position behind said receiving optical system, a prolongation of a longitudinal direction of the receiving surface crossing said distance measurement axis.

21. A distance measuring device according to claim 19, wherein said receiving unit comprises:

a receiving optical system arranged outside a plane including said projecting unit and said distance measurement axis; and a receiving element arranged behind said receiving optical system to detect a receiving position in a direction substantially parallel to a direction of thickness of the planar light beam.

22. A distance measuring device according to claim 19, wherein a crossing angle θ formed by a longitudinal direction of a cross section of said planar light beam with a longitudinal direction of a cross section of said planar region in a plane perpendicular to an optical axis of said photograph optical system falls within a range 60°≦θ≦120°.

23. A distance measuring device according to claim 19, wherein a crossing angle θ formed by a longitudinal direction of a cross section of said planar light beam with a longitudinal direction of a cross section of said planar region in a plane perpendicular to an optical axis of said photograph optical system is substantially a right angle.

24. A distance measuring device according to claim 13, wherein the planar light beam projected from said projecting unit is flattened in a direction substantially parallel to a detection direction of the receiving angle or receiving position in said receiving unit.

25. A distance measuring device according to claim 13, further comprising:

a second projecting unit to project a rod-like light beam in a direction substantially parallel to a distance measurement axis that connects said distance measuring portion and an object-side principal point of a photograph optical system of a camera.

26. A distance measuring device according to claim 14, further comprising:

a second projecting unit to project a rod-like light beam in a direction substantially parallel to a distance measurement axis that connects said distance measuring portion and an object-side principal point of a photograph optical system of a camera.

27. A distance measuring device according to claim 15, further comprising:

a second projecting unit to project a rod-like light beam in a direction substantially parallel to a distance measurement axis that connects said distance measuring portion and an object-side principal point of a photograph optical system of a camera.

28. A distance measuring device according to claim 16, further comprising:

a second projecting unit to project a rod-like light beam in a direction substantially parallel to a distance measurement axis that connects said distance measuring portion and an object-side principal point of a photograph optical system of a camera.

29. A distance measuring device according to claim 17, further comprising:

a second projecting unit to project a rod-like light beam in a direction substantially parallel to a distance measurement axis that connects said distance measuring portion and an object-side principal point of a photograph optical system of a camera.

30. A distance measuring device according to claim 18, further comprising:

a second projecting unit to project a rod-like light beam in a direction substantially parallel to a distance measurement axis that connects said distance measuring portion and an object-side principal point of a photograph optical system of a camera.

31. A distance measuring device according to claim 19, further comprising:

a second projecting unit to project a rod-like light beam in a direction substantially parallel to a distance measurement axis that connects said distance measuring portion and an object-side principal point of a photograph optical system of a camera.

32. A distance measuring device according to claim 20, further comprising:

a second projecting unit to project a rod-like light beam in a direction substantially parallel to a distance measurement axis that connects said distance measuring portion and an object-side principal point of a photograph optical system of a camera.

33. A distance measuring device according to claim 21, further comprising:

a second projecting unit to project a rod-like light beam in a direction substantially parallel to a distance measurement axis that connects said distance measuring portion and an object-side principal point of a photograph optical system of a camera.

34. A distance measuring device according to claim 22, further comprising:

a second projecting unit to project a rod-like light beam in a direction substantially parallel to a distance measurement axis that connects said distance measuring portion and an object-side principal point of a photograph optical system of a camera.

35. A distance measuring device according to claim 23, further comprising:

a second projecting unit to project a rod-like light beam in a direction substantially parallel to a distance measurement axis that connects said distance measuring portion and an object-side principal point of a photograph optical system of a camera.

36. A distance measuring device according to claim 24, further comprising:

a second projecting unit to project a rod-like light beam in a direction substantially parallel to a distance measurement axis that connects said distance measuring portion and an object-side principal point of a photograph optical system of a camera.

* * * * *